United States Patent
Richards

(10) Patent No.: US 7,027,493 B2
(45) Date of Patent: Apr. 11, 2006

(54) SYSTEM AND METHOD FOR MEDIUM WIDE BAND COMMUNICATIONS BY IMPLUSE RADIO

(75) Inventor: James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 1092 days.

(21) Appl. No.: 09/761,766

(22) Filed: Jan. 18, 2001

(65) Prior Publication Data

US 2001/0033576 A1 Oct. 25, 2001

Related U.S. Application Data

(60) Provisional application No. 60/176,800, filed on Jan. 19, 2000.

(51) Int. Cl.
*H04B 1/69* (2006.01)
*H04B 1/707* (2006.01)
*H04B 1/713* (2006.01)

(52) U.S. Cl. .............. 375/150; 375/147; 375/140; 375/130

(58) Field of Classification Search ................ 375/150, 375/147, 140, 130, 259, 343; 370/324, 280, 370/503
See application file for complete search history.

(56) References Cited

U.S. PATENT DOCUMENTS

| | | | |
|---|---|---|---|
| 5,455,593 A | 10/1995 | Ross | 342/375 |
| 5,512,834 A | 4/1996 | McEwan | 324/642 |
| 5,519,400 A | 5/1996 | McEwan | 342/28 |
| 5,521,600 A | 5/1996 | McEwan | 342/27 |
| 5,576,627 A | 11/1996 | McEwan | 324/639 |
| 5,581,256 A | 12/1996 | McEwan | 342/27 |
| 5,589,838 A | 12/1996 | McEwan | 342/387 |
| 5,630,216 A | 5/1997 | McEwan | 455/215 |
| 5,677,927 A * | 10/1997 | Fullerton et al. | 375/130 |
| 5,683,164 A | 11/1997 | Chien | 362/78 |
| 5,687,169 A * | 11/1997 | Fullerton | 370/324 |
| 5,832,772 A | 11/1998 | McEwan | 73/290 R |
| 5,966,090 A | 10/1999 | McEwan | 342/27 |
| 5,986,600 A | 11/1999 | McEwan | 342/28 |
| 6,137,438 A | 10/2000 | McEwan | 342/134 |
| 6,539,213 B1 * | 3/2003 | Richards et al. | 455/226.3 |
| 6,925,109 B1 * | 8/2005 | Richards et al. | 375/150 |
| 2003/0147480 A1 * | 8/2003 | Richards et al. | 375/343 |

* cited by examiner

*Primary Examiner*—Phuong Phu
(74) *Attorney, Agent, or Firm*—Venable LLP; Robert S. Babayi

(57) ABSTRACT

A system and a method for medium wide band communications using impulse radio techniques. The method of transmitting medium wide band signals includes the steps of producing a sinusoidal signal and a train of preferably Gaussian shaped pulses. The method also includes the steps of multiplying the sinusoidal signal by the train of pulses to produce a train of sinusoidal bursts, and transmitting the train of sinusoidal bursts. The center frequency of the transmitted signal consisting of the train of sinusoidal bursts can be controlled by selecting an appropriate frequency of the sinusoidal signal. The bandwidth of the transmitted signal can be controlled by selecting an appropriate width of the pulses in the train of pulses. Information and/or coding modulation can be accomplished by adjusting the time position and/or phase of the sinusoidal bursts.

4 Claims, 27 Drawing Sheets

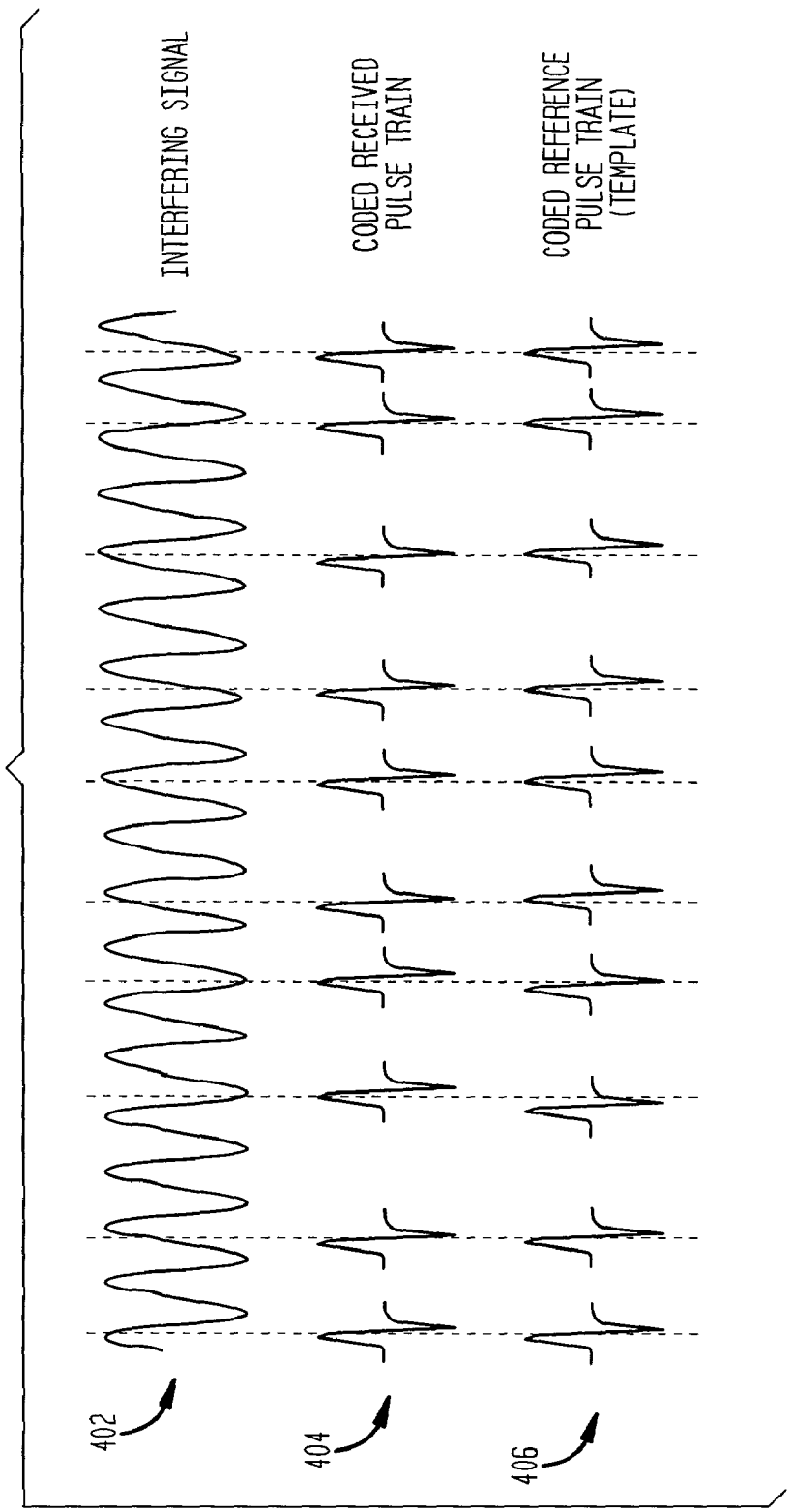

MWB TRANSMITTER WITHOUT CODING

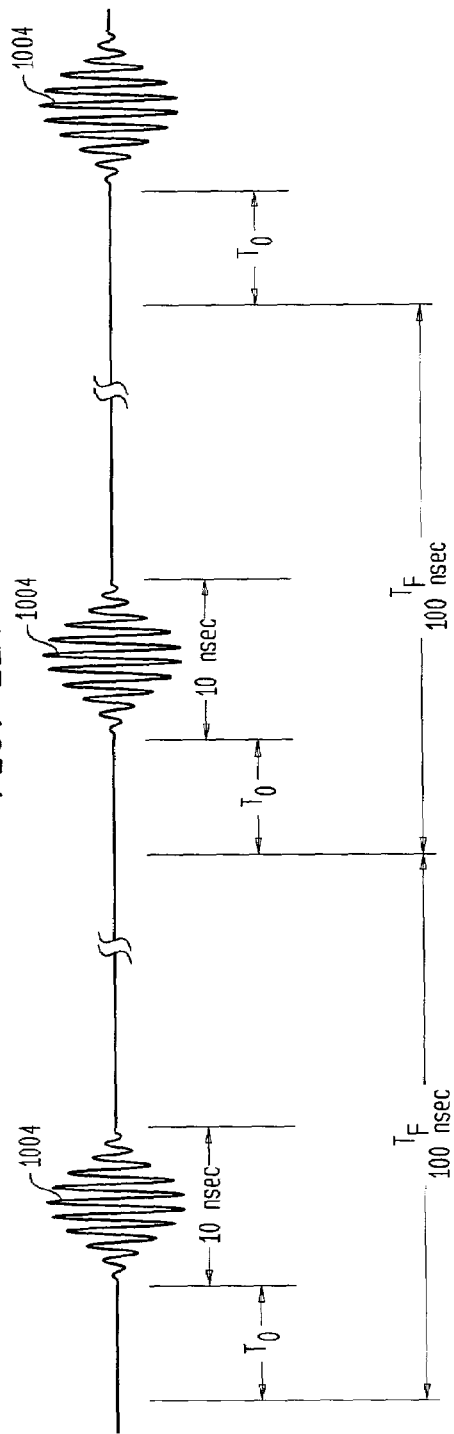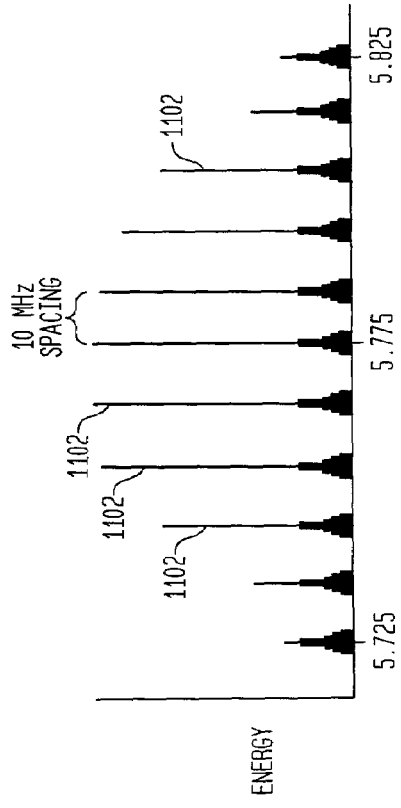

SYSTEM AND METHOD FOR MEDIUM WIDE BAND COMMUNICATIONS BY IMPLUSE RADIO

CROSS-REFERENCE TO RELATED APPLICATIONS

This application claims priority to U.S. Provisional Application No. 60/176,800, filed Jan. 19, 2000.

BACKGROUND OF THE INVENTION

1. Field of the Invention

The present invention relates generally to a method and apparatus for wireless communication. More particularly, the present invention provides a system and method for medium wide band communications by impulse radio.

2. Related Art

The world of cyberspace is flourishing with new services and a diversity of information, but gaining full participation in these services is often limited because high-bandwidth access to the NII (National Information Infrastructure) remains expensive and scarce. In most cases, high-capacity access to the NII is available only through monopoly service providers who offer limited options at high prices. Where competitive options are available, they are often priced beyond the reach of individuals and local institutions. An unlicensed NII Band can help alleviate this access bottleneck by creating a new competitive access option which operates without any single gatekeeper. Such a service will stimulate competition with existing access providers and offer consumers a more flexible and affordable method of connecting to the NII.

The FCC has provided unlicenced devices with access to 300 MHz of spectrum at 5 GHz to accommodate the demand by educational, medical, business, industrial and consumer users for broadband multimedia communications. Unlicenced NII (U-NII) devices must share the spectrum with primary services without causing radio interference to those services. The FCC has adopted technical restrictions for U-NII devices, particularly transmit power and out-of-band emission limits. The FCC has also denied access to specific portions of the spectrum where sharing would be particularly difficult. Specifically, the FCC is providing U-NII devices access to three 100 MHz bands at 5.15–5.25 GHz, 5.25–5.35 GHz and 5.725–5.825 GHz. Thus, there is a need to develop communication methods and systems that can use these available 100 MHz bands to meet the high speed data requirements of the present and future.

SUMMARY OF THE INVENTION

The present invention is directed to a system and a method for achieving high speed data transfer over medium wide band radio frequency channels (e.g., 100 MHz bands) using impulse radio techniques.

According to one embodiment of the present invention, an impulse radio transmitter includes a sine generator that outputs a sinusoidal signal, a precision timing generator that outputs a trigger signal, and a gate function generator that receives the trigger signal and outputs a train of pulses, wherein each pulse is preferably Gaussian in shape. A multiplier multiplies the sinusoidal signal with the train of pulses and outputs a train of sinusoidal bursts, each burst comprising plural zero crossings and an envelope shape that is preferably Gaussian. This train of sinusoidal bursts can then be transmitted by an antenna.

A frequency of the sinusoidal signal output from the sine generator dictates a center frequency of the transmitted train of sinusoidal bursts (i.e., the center frequency is equal to the frequency of the sinusoidal signal).

A width of each pulse in the train of pulses output from the gate generator dictates a bandwidth of the transmitted train of sinusoidal bursts (i.e., the bandwidth is substantially equal to a reciprocal of the width).

Information and coding modulation can be accomplished by adjusting the time position of the sinusoidal bursts. For example, in one embodiment the precision timing generator receives an information signal from an information source and produces the trigger signal using the information signal. In another embodiment, the precision timing generator receives an information signal from an information source and a coding signal from a coding generator and produces the trigger signal using the information signal and said coding signal.

Alternatively, information and code modulation can be accomplished by adjusting the phase of the sinusoidal bursts. For example, in one embodiment, the transmitter includes a precision phase adjustor that outputs a phase adjustment signal and a phase modulator that receives the phase adjustment signal and adjusts a phase of the sinusoidal signal using the phase adjustment signal. The precision phase adjustor can receive an information signal from an information source and produce the phase adjustment signal using the information signal. This causes the phase modulator to adjust the phase of the sinusoidal signal, and thus the sinusoidal bursts, based on the information signal. The precision phase adjustor can also receive a coding signal from a coding generator and produce the phase adjustment signal using the information signal and the coding signal. This causes the phase modulator to adjust the phase of the sinusoidal signal, and thus the sinusoidal bursts, based on the information signal and the coding signal.

In another embodiment, the sinusoidal bursts are both phase and position modulated based on an information signal. In still another embodiment, the sinusoidal bursts are both phase and position modulated based on an information signal and a coding signal. In another embodiment, the sinusoidal bursts are position modulated based on at least one of a code signal and an information signal, and phase modulated based on at least one of the code signal and the information signal.

The present invention is also directed to system and method for receiving medium wide band impulse radio signals. According to one embodiment of the present invention, an impulse radio receiver includes a sine generator that outputs a sinusoidal signal, a precision timing generator that outputs a trigger signal, and a gate function generator that receives the trigger signal and outputs a train of pulses (which are preferably Gaussian in shape). A multiplier multiplies the sinusoidal signal with the train of pulses and outputs a template signal consisting of a train of sinusoidal bursts. A cross correlator is then used to cross correlate a received impulse radio signal with the template signal to produce a baseband signal.

If the received signal is coded, then the impulse radio receiver includes a code generator that outputs a coding signal that is the same as the coding signal used to generate the received signal. If the received signal was coded using pulse position modulation, then the precision timing generator receives the coding signal and produces the trigger signal using the coding signal. If the received signal was coded using phase shift modulation, then a precision phase adjustor receives the coding signal and produces a phase adjustment signal. A phase modulator receives the phase adjustment signal and adjusts a phase of the sinusoidal signal, based on the phase adjustment signal (and thus the coding signal), prior to the multiplier multiplying the sinusoidal signal with the train of pulse. If the receive signal was coded using pulse position and phase shift modulation, then the template signal is generated accordingly.

An important feature of the present invention is that it provides a system and method for efficiently and effectively using the medium wide frequency bands that could be made available by the FCC.

Further features and advantages of the present invention, as well as the structure and operation of various embodiments of the present invention, are described in detail below with reference to the accompanying drawings.

BRIEF DESCRIPTION OF THE DRAWINGS

Within the accompanying drawings, the convention used to describe signal connections requires that a signal line end at a junction with another signal line to indicate a connection. Two signal lines that cross indicate no connection at the crossing. The present invention will now be described with reference to the accompanying drawings, wherein:

FIG. 4 illustrates a typical received signal and interference signal;

FIG. 11A illustrates an exemplary signal that is generated using a transmitter of the present invention;

FIG. 11B illustrates the frequency domain amplitude of a sequence of sinusoidal bursts;

DETAILED DESCRIPTION OF THE EMBODIMENTS

I. Overview of the Invention

Figure 1A:
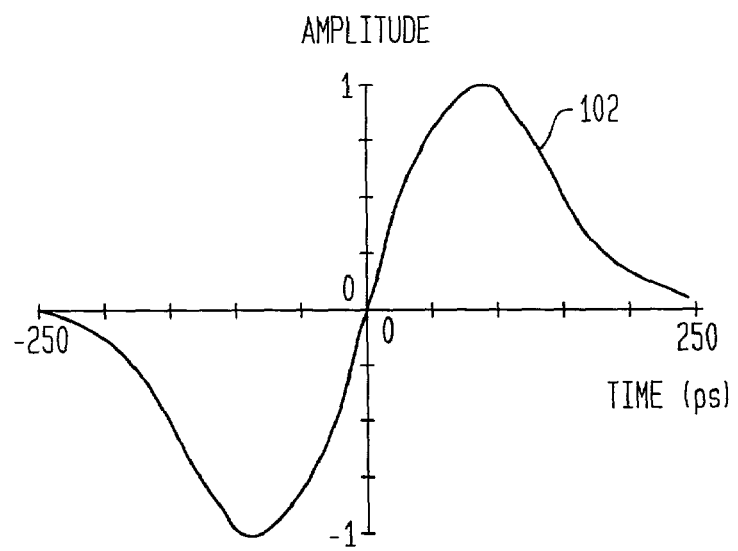
FIG. 1A illustrates a representative Gaussian Monocycle waveform in the time domain.

The present invention is directed to a system and a method for achieving high speed data transfer over medium wide band radio frequency channels (e.g., 100 MHz bands) using impulse radio techniques. According to the invention, a sine generator is used to generate a sinusoidal signal that will dictate the center frequency of the impulse radio signal. A train of pulses is generated, wherein the width of each pulse will dictated the bandwidth of the impulse radio signal. The sinusoidal signal is multiplied by the train of pulses to produce a medium wide band impulse radio signal that consists of a train of sinusoidal bursts. Information can be imparted on the train of sinusoidal bursts by adjusting the phase of the sinusoidal signal and/or the time positioning of each pulse. Additionally, coding can be used to spread the frequency spectrum of the medium wideband impulse radio signal.

The present invention builds upon ultrawide band impulse radio techniques to produce medium wideband impulse radio signals that fit within FCC requirements. Accordingly, prior to a discussion of the specific embodiments of the present invention is an overview of specific FCC requirements and an overview of impulse radio basics, which are useful for understanding the present invention.

II. Overview of FCC Requirements

Federal Communications Commissions (FCC) Report and Order, titled "Amendment of the Commission's Rules to Provide for Operation of Unlicensed NII Devices in the 5 GHz Frequency Range", (ET Docket 96-102, FCC 97-5, adopted Jan. 9, 1997, and released Jan. 9, 1997; a summary may be found at 62 FR 4649) sets forth the final rule for the Unlicensed-NII (U-NII) bands of the spectrum. Selected section of this FCC final rule are reproduced below.

U-NII proponents argue that U-NII devices will provide communications that are flexible, mobile, have high data rates, and are low cost. They contend that existing wireless allocations and wireline alternatives may each be capable of providing some of these attributes, but not all of them. They contend that although some communication paths can be provided on wired networks or through currently allocated spectrum (like unlicensed Personal Communications Services ("U-PCS")), those capabilities are inadequate to meet communications needs in a large and growing number of circumstances because they are not capable of providing the necessary data rates and do not have a sufficient amount of spectrum available to meet all of the needs. Specifically, they argue that U-PCS does not provide sufficient capacity, wired networks lack flexibility and mobility, and other licensed wireless services are too costly. U-NII proponents claim that unlicensed devices governed by flexible technical rules would enable the provision of a wide range of multi-media broadband digital communications at substantially lower costs than those offered by wired and licensed-wireless networks. U-NII devices could function as unlicensed LAN facilities that would be capable of providing the last-mile loop within educational settings in a cost effective manner.

The FCC has ruled that there is a need for unlicensed wireless devices that will be capable of providing data rates as high as 20 Mbits/sec to meet the multimedia communication requirements envisioned by the U-NII proponents. To achieve these high data rates at a reasonable cost, the FCC believes that these devices must use broad bandwidths of up to 20 MHz each and therefore these devices must have access to a substantial amount of spectrum to accommodate a number of devices within the same area. Further, the FCC believes that accessibility to a substantial amount of spectrum is necessary for these devices to develop and mature to their full potential. Recent developments in digital technologies have greatly increased the requirements for transferring large amounts of information and data in relatively short time frames from one network or system to another. Specifically, computers have much faster central processing units and substantially increased memory capabilities, which have increased the demand for devices that can more quickly transfer larger amounts of data. Further, digital equipment is capable of switching and directing large amounts of information within networks. In addition to these technical advances in hardware capability, there has been substantial growth in the use, size, and complexity of digital networks as well. Many of these networks are not only growing internally in the amount and types of data they contain, but are also increasingly being used in combination and interaction with other such networks. Educational institutions, business, industry, and consumers are all looking for ways to begin taking advantage of the innovative technological developments that promise the delivery of multimedia services comprising voice, video, imaging, and data. Commenters argue that existing wireline and wireless services, in some cases, may not be able to meet all of the communications requirements and demands that these technological developments bring in a cost-effective manner. Thus, U-NII devices may be able to provide cost-effective communications services that will both complement and compete with existing services. For example, the spectrum and associated regulatory structure developed for U-PCS devices were not designed to handle broadband multimedia computer applications. Equipment in the U-PCS bands is limited to a maximum bandwidth of 2.5 MHz and would not support data rates of 20 Mbits/sec or greater as envisioned for U-NII devices. Further, if the FCC were to authorize broadband, high data rate equipment to use the 30 MHz of spectrum available for U-PCS, that spectrum would quickly become congested and would have limited use for the types of operations it is intended to accommodate. The FCC believes that as the U-NII and other telecommunications infrastructures grow, new communications alternatives that are flexible and inexpensive will be needed to assure delivery of information and services to all members of our society, regardless of income or location.

The present invention is directed to a system and method that operates in the spectrum for wireless unlicensed digital network communications devices to meet the foreseeable communications demands of multimedia network systems. This will facilitate rapid and inexpensive wireless access to information resources by educational institutions, business, industry, and consumers. Making this spectrum available for U-NII devices will further the FCC's mandate, in Section 257(b) of the Communications Act, to promote vigorous competition and technological advancement. For example, allowing unlicensed devices access to the U-NII bands would permit educational institutions to form inexpensive broadband wireless computer networks between classrooms, thereby providing cost-effective access to an array of multimedia services on the Internet. In addition, unlicensed wireless networks could help improve the quality and reduce the cost of medical care by allowing medical staff to rapidly and inexpensively obtain patient data, X-rays, and medical charts.

Although some communications requirements, particularly the longer range community networks, could be partially accommodated through licensed services, such as the fixed point-to-point and point-to-multipoint services, the inventors believe that the unlicensed devices contemplated here will both complement and provide a cost-effective alternative to such services. They may also provide an additional and competitive means for educational institutions, libraries, and health care providers for rural areas to connect to basic and advanced telecommunications services. Given that the communications needs of these institutions are expected to be very great and that the technical means best suited to meeting these needs may vary considerably from institution to institution, it is desirable that a variety of communications options, including unlicensed operations such as U-NII devices, be available to address these needs.

II.1. Available Spectrum

The FCC has provided unlicensed devices with access to a substantial amount of spectrum at 5 GHz to accommodate the demand by educational, medical, business, industrial and consumer users for broadband multimedia communications. U-NII devices must share the spectrum with primary services without causing radio interference to those services. The FCC has adopted technical restrictions for U-NII devices, particularly transmit power and out-of-band emission limits (see technical discussion below), and by avoiding portions of the spectrum where sharing would be particularly difficult. Accordingly, the FCC has made 300 MHz of spectrum available for U-NII devices. Specifically, the FCC is providing U-NII devices access to three 100 MHz bands at 5.15–5.25 GHz, 5.25–5.35 GHz and 5.725–5.825 GHz. This amount of spectrum provides an appropriate balance between spectrum sharing concerns and providing sufficient spectrum to satisfy the needs of U-NII devices.

This 300 MHz of spectrum will provide sufficient spectrum to allow the full potential of broadband multimedia technologies to be realized. This spectrum provides for open entry and equal access by all such devices and to allow access to the spectrum by multiple users at a common location using a variety of different devices. In this regard, these broadband devices each may require 20 to 25 MHz channel bandwidth to provide the high data rates. Furthermore, as discussed in greater detail below, the different sharing environments applicable to the three 100 MHz sub-bands, 5.15–5.25, 5.25–5.35, and 5.725–5.825 GHz, require that U-NII operations comply with discrete technical standards for each sub-band.

II.2. FCC Minimum Technical Regulations

The FCC has adopted the minimum technical regulations which are believed to facilitate the introduction of U-NII devices, adequately protect primary services, and promote sharing among U-NII devices. These rules specify power limits (in terms of peak power and power spectral density), emission limits, radio frequency hazard requirements, and other basic technical rules appropriate for unlicensed operations defined in 47 C.F.R. Part 15 of the Federal Communications Commission's rules (referred to hereafter as Part 15 operations). The FCC has not adopted a spectrum etiquette, a channelization plan, or a minimum modulation efficiency requirement because the FCC believes that such requirements are unnecessary at this time, could preclude certain technologies, and could unnecessarily delay implementation of U-NII devices.

The primary users and the considerations that relate to interference with their operations, vary in different parts of the spectrum that the FCC is providing for U-NII devices. Specifically, the 5.15–5.25 GHz band will be shared with mobile satellite service (MSS) feeder links; the 5.25–5.35 GHz band will be shared with Government radiolocation operations; and the 5.725–5.825 GHz band will be shared with Government radiolocation, Amateur, ISM, and other Part 15 operations. Therefore, because the sharing environment for U-NII devices will be different for each of these three 100 MHz segments. The FCC has struck a balance between providing sufficient power limits for U-NII devices and protecting primary operations by adopting different power levels for U-NII devices in each of the three 100 MHz bands. This approach provides the needed flexibility to allow U-NII proponents to design and manufacture equipment to meet a variety of communications needs while ensuring a successful spectrum sharing environment with other spectrum users.

Accordingly, the FCC has established the maximum U-NII device power limits for each of the 100 MHz bands as follows: a) in the 5.15–5.25 GHz band, the maximum peak transmitter output power limit will be 50 mW with up to 6 dBi antenna gain permitted, which equates to 200 mW Equivalent Isotropically Radiated Power (EIRP); b) in the 5.25–5.35 GHz band, the maximum peak transmitter output power limit will be 250 mW with up to 6 dBi antenna gain permitted, which equates to 1 W EIRP; and c) in the 5.725–5.825 GHz band, the maximum peak transmitter output power limit will be 1 W with up to 6 dBi directional antenna gain permitted, which equates to 4 W EIRP. To permit manufacturers flexibility in designing U-NII equipment, the FCC will permit the use of higher directional antenna gain provided there is a corresponding reduction in transmitter output power of one dB for every dB that the directional antenna gain exceeds 6 dBi.

In the 5.15–5.25 GHz sub-band, a 50 mW peak output power with up to 6 dBi gain antenna will provide U-NII devices great flexibility in how this band is used. Specifically, these power limits allows U-NII devices to provide a variety of short-range communications, such as those between computing devices (such as computers, servers, printers, etc.) within a very local area, such as in a room or in adjoining rooms. Restricting U-NII devices to this low power allows U-NII devices to share this band with co-channel MSS feeder link operations. In this regard, we note that the initial European Conference of Postal and Telecommunications Administrations ("CEPT") studies conclude that High Performance Local Area Network (HIPERLAN) systems, which have technical characteristics similar to those of U-NII devices, can share this band with the MSS operations without causing harmful interference to the MSS feeder links. (See Section E "Spectrum Sharing Considerations" below.) While some commentors on this new FCC regulation have argued that based on the CEPT studies that U-NII devices could operate at higher powers than what the FCC has adopted without causing interference, the FCC recognized that since the CEPT study was made, satellite system provider Globalstar has changed some of the parameters of its system and that its MSS feeder links potentially could be more susceptible to interference. In any event, the power levels were adopted to ensure that U-NII devices do not cause harmful interference to MSS feeder link operations.

The FCC also restricted U-NII use of this band to indoor operations. This will provide additional protection to co-channel MSS operations due to the attenuation of U-NII device signals as they pass through the walls and ceilings of buildings. Accordingly, this power limit, along with the restriction on outdoor operations, provides the desired balance of providing sufficient power for U-NII devices in this band, high frequency reuse, great flexibility in the types of U-NII operations that are accommodated in this band, and protection of co-channel MSS operations.

In the 5.25–5.35 GHz sub-band, the FCC adopted a higher maximum peak transmitter input power limit of 250 mW, along with the associated higher power spectral density limit noted below. U-NII devices are not restricted in this band to indoor operations because it will not be shared with MSS operations. The FCC believes that U-NII operations with a peak transmitter output power of up to 250 mW and a directional antenna with up to 6 dBi of gain will be sufficient to accommodate communications within and between buildings, such as are envisioned for campus-type LANs. The only current operations in this band are Government radiolocation systems (radar), and National Telecommunications and Information Administration (NAIA) has supported allowing higher power for U-NII operations in this portion of the band. These power and antenna gain limits are comparable to the 1 W EIRP limit used for HIPERLAN and therefore should provide manufacturers with economies of scale in developing equipment useable in both the domestic and international markets.

In the 5.725–5.825 GHz band, spread spectrum Part 15 devices are already authorized to operate with 1 W transmitter peak output power and with up to 6 dBi gain transmitting antennas. Accordingly, the FCC has authorized similar peak power and antenna gain parameters for U-NII devices in this band. U-NII operations that comply with this power limit will be able to provide community networks with a typical range of several kilometers. Further, longer-range communications could be possible in areas with a low interference environment (i.e., rural areas) where high gain receive antennas could be used. (Such antennas do not affect the transmitted emission level or EIRP.)

Additionally, in all three bands peak power spectral density is limited to ensure that the power transmitted by U-NII devices is evenly spread over the emission bandwidth. Specifically, the regulations require U-NII devices to decrease transmitter output power proportionally to any decrease in emission bandwidth below 20 MHz. These requirements will decrease the potential for interference to other services and will encourage the use of the U-NII bands for the broadband operations for which they are intended. For U-NII devices operating with less than 20 MHz of emission bandwidth, power spectral density is limited as follows: a) in the 5.15–5.25 GHz band, the transmitter peak power spectral density will be 2.5 mW/MHz for an antenna gain of 6 dBi; b) in the 5.25–5.35 GHz band, the transmitter peak power spectral density will be 12.5 mW/MHz for an antenna gain of 6 dBi; and c) in the 5.725–5.825 GHz band, the transmitter peak power spectral density will be 50 mW/MHz for an antenna gain of 6 dBi. Finally, to allow manufacturers flexibility in designing U-NII devices, the regulation allows operations with antenna gains exceeding 6 dBi if the peak power spectral density is reduced by the same amount the directional antenna gain exceeds 6 dBi.

In the 5.15–5.25 GHz band, transmitting antennas are required to be an integral part of the U-NII device. This will ensure that authorized power limits are not exceeded in this band. In the 5.25–5.35 GHz and 5.725–5.825 GHz bands, the U-NII device must use a permanently attached antenna or an antenna that uses a unique coupling to the U-NII devices in accordance with Section 15.203(a) of the FCC rules. These requirements will limit potential interference to other systems and will provide for greater frequency reuse by U-NII devices.

II.3. Emissions Outside the Band of Operation

Limits on emission levels outside the bands of operation and frequency stability requirements are necessary to protect adjacent spectrum occupants and sensitive operations that may operate on harmonic frequencies. However, in view of the higher and different power limits adopted for U-NII devices in each of these bands, the FCC is requiring U-NII devices operating in the upper band to attenuate emissions below the maximum power spectral density by a factor of at least 40 dB for frequencies from the band edge to 10 MHz from the band edge and by a factor of at least 50 dB for frequencies greater than 10 MHz from the band edge. For the other two bands which have lower maximum power limits the FCC will take this limit as an absolute limit. This will provide the same level of interference protection outside all three bands. Accordingly, the attenuation of peak levels of emissions outside of the frequency bands of operation below the maximum peak power spectral density contained within the bands of operation must be in accordance with the following limits:

I) For transmitters operating in the band 5.15–5.25 GHz: all emissions within the frequency range 5.14–5.15 GHz and 5.35–5.36 GHz must be attenuated by a factor of at least 27 dB; within the frequency range outside these bands by a factor of at least 37 dB.

ii) For transmitters operating in the 5.25–5.35 GHz band: all emissions within the frequency range from the band edge to 10 MHz above or below the band edge must be attenuated by a factor of at least 34 dB; for frequencies 10 MHz or greater above or below the band edge by a factor of at least 44 dB.

iii) For transmitters operating in the 5.725–5.825 GHz band: all emissions within the frequency range from the band edge to 10 MHz above or below the band edge must be attenuated by a factor of at least 40 dB; for frequencies 10 MHz or greater above or below the band edge by a factor of at least 50 dB.

As already specified in the FCC rules, the measurements of such emissions shall be performed using a minimum resolution bandwidth of 1 MHz. Regardless of the attenuation levels shown above, the FCC does not require emissions outside the frequency range of operation to be attenuated below the general radiated emission limits in Section 15.209 of the rules. Further, the FCC did not specify these emission limits as a maximum power spectral density of the operating band, because such a limit would have to be adjusted with changes in antenna gain in order to maintain a consistent interference potential. The emission limits being adopted are based on the peak power spectral density within the band of operation, and the power spectral density is varied to reflect changes in the gain of the antenna. It is recognized that changes to the gain of the antenna at harmonic frequencies may not directly correlate with changes to the antenna gain at the fundamental frequency. However, the limits being adopted for spurious emissions are sufficient to reduce the probability of harmful interference. Further, the provisions in Section 15.205 of the FCC rules will ensure that harmful interference does not result to critical safety services regardless of antenna gain.

Further, the FCC has removed the 5.15–5.25 GHz band from the restricted bands listed at Section 15.205 of the rules. U-NII devices will have to comply with the provisions of Section 15.205 in order to protect sensitive operations. The 4.5–5.15 GHz and 5.35–5.46 GHz bands remain restricted; therefore, U-NII devices operating close to the band edges at 5.15 GHz or 5.35 GHz will be required to sharply attenuate their signal at the band edge or avoid using the spectrum close to the band edge. This requirement will not significantly affect U-NII operations overall. In any event, this requirement is needed to protect sensitive and safety-of-life operations in adjacent bands. Additionally, emissions must comply with the general field strength limits set forth in Section 15.209. Finally, any U-NII devices that use an AC power line must comply with the conducted limits set forth in Section 15.207.

III. Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

III.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
$\sigma$ is a time scaling parameter,
t is time,
$f_{mono}(t)$ is the waveform voltage, and
e is the natural logarithm base.

Figure 1B:
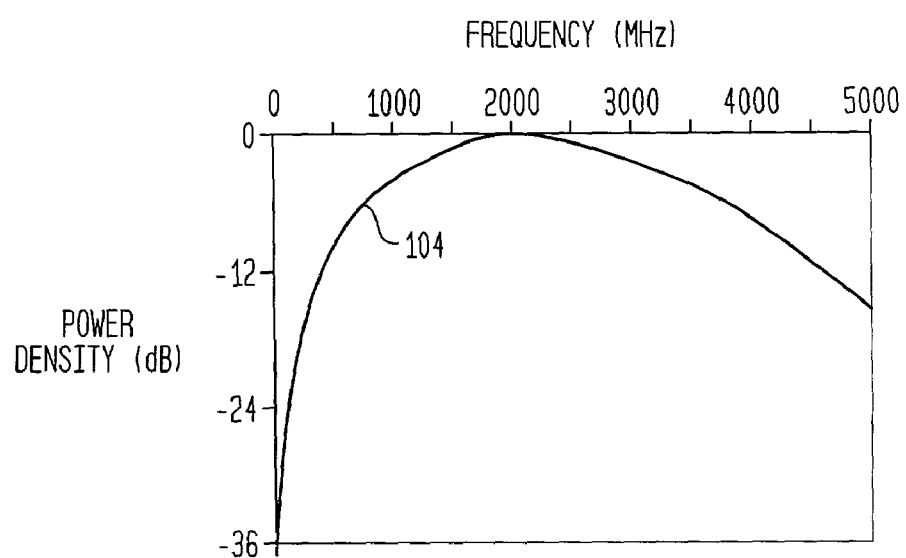
FIG. 1B illustrates the frequency domain amplitude of the Gaussian Monocycle of FIG. 1A.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

III.2. A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2A:
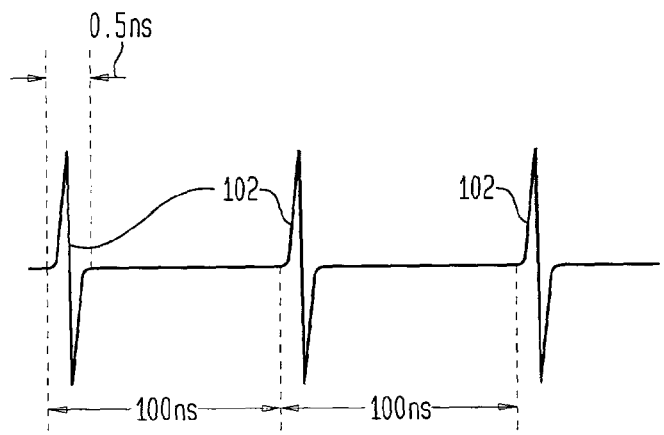
FIG. 2A illustrates a pulse train comprising pulses as in FIG. 1A.
Figure 2B:
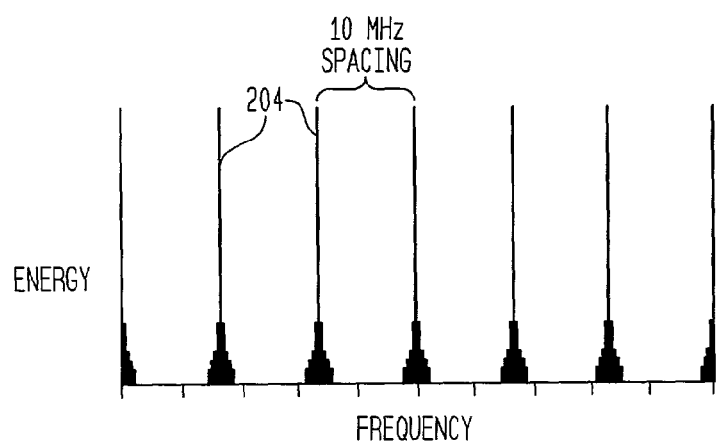
FIG. 2B illustrates the frequency domain amplitude of the waveform of FIG. 2A.

Prototypes built by the inventors have pulse repetition frequencies including 0.7 and 10 megapulse per second (Mpps, where each megapulse is $10^6$ pulses). FIGS. 2A and 2B are illustrations of the output of a typical 10 Mpps system with uncoded, unmodulated, 0.5 nanosecond (nsec) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of comb lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 nsec pulse in a 100 nsec interval.

III.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
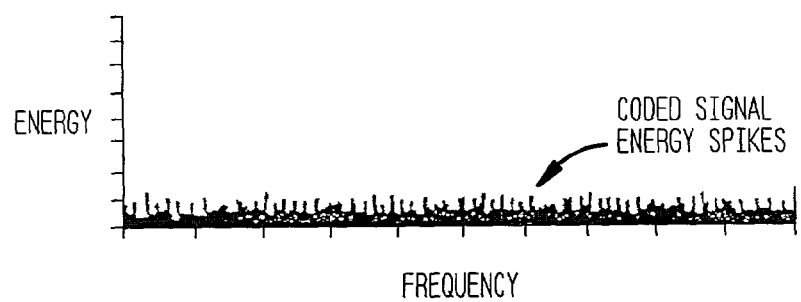
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

III.4. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 nsec; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

III.5. Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

III.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

III.7. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz channel bandwidth, the theoretical processing gain is 200,000 or 53 dB.

III.8. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation.

$$V_{tot}^2 = \frac{N\sigma^2}{\sqrt{Z}}$$

Where, $V^2_{tot}$ is the total interference signal to noise ratio variance, at the receiver, N is the number of interfering users, $\sigma^2$ is the signal to noise ratio variance resulting from one of the interfering signals with a single pulse cross correlation, and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

III.9. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their relative phase. This results in possible summation or possible cancellation, depending on the specific propagation to a given location. This also results in potentially wild signal strength fluctuations in mobile applications, where the mix of multipath signals changes for every few feet of travel.

Figure 5A:
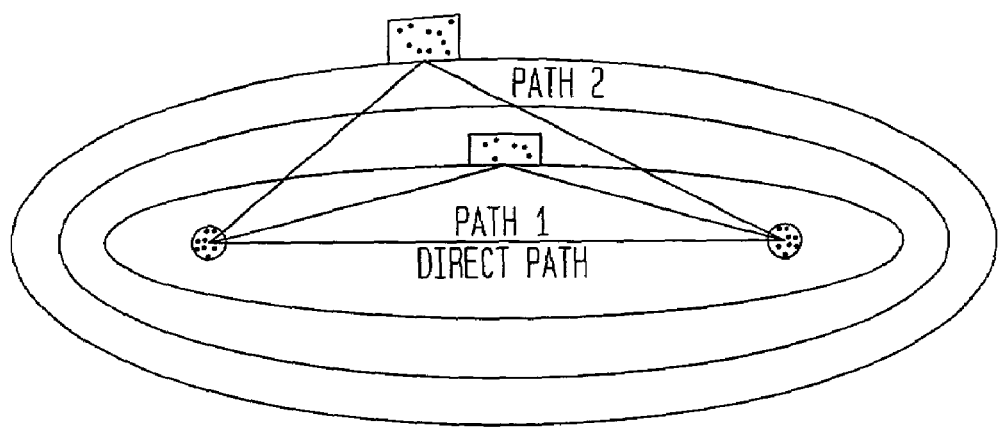
FIG. 5A illustrates a typical geometrical configuration giving rise to multipath received signals.

Impulse radios, however, are substantially resistant to these effects. Impulses arriving from delayed multipath reflections typically arrive outside of the correlation time and thus are ignored. This process is described in detail with reference to FIGS. 5A and 5B. In FIG. 5A, three propagation paths are shown. The direct path is the shortest. It represents the straight line distance between the transmitter and the receiver. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
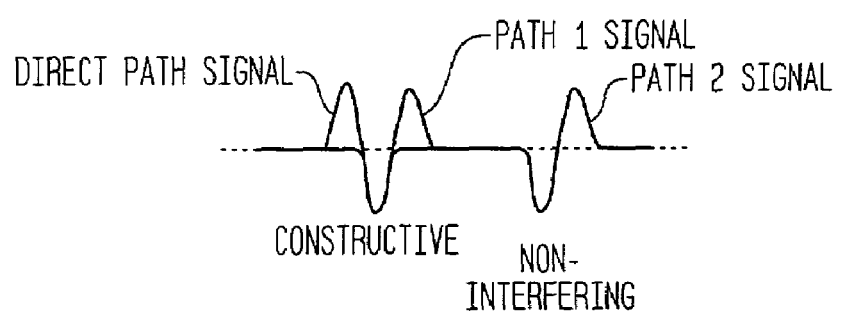
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect. The bulk of the multipath signals, which are substantially delayed, are removed from the correlation process and are ignored.

The multipath signals delayed less than one quarter wave (one quarter wave is about 1.5 inches, or 3.5 cm at 2 GHz center frequency) are the only signals that will attenuate the direct path signal. This is the reflection from the first Fresnel zone, and this property is shared with narrow band signals; however, impulse radio is highly resistant to all other Fresnel zone reflections. The ability to avoid the highly variable attenuation from multipath gives impulse radio significant performance advantages.

III.10. Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by In phase and Citriodora Signals in a Radio System", both of which are incorporated herein by reference.

III.11. Exemplary Transmitter

Figures 6, 7:
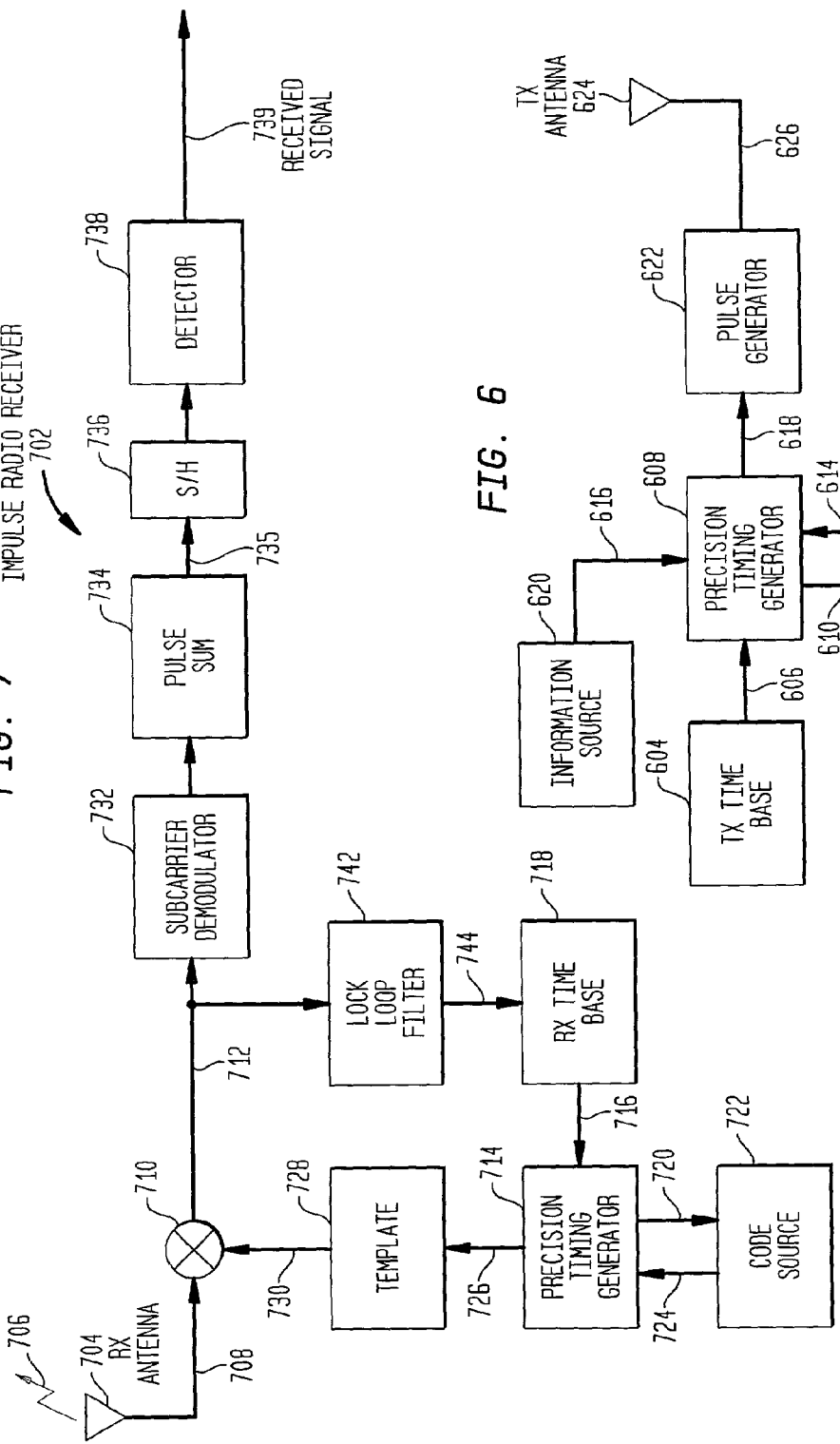
FIG. 6 is a functional diagram of an exemplary ultra wide band impulse radio transmitter.
FIG. 7 is a functional diagram of an exemplary ultra wide band impulse radio receiver.

FIG. 6 shows a simple wide or ultra-wide band transmitter 602 for use in an impulse radio communications system. Transmitter 602 includes a time base 604 that generates a periodic timing signal 606. Time base 604 typically comprises a voltage controlled oscillator (VCOS), or the like, having a high timing accuracy and low jitter, on the order of picoseconds (ps). The voltage control to adjust the VCOS center frequency is set at calibration to the desired center frequency use to define the transmitter's nominal pulse repetition rate. The periodic timing signal 606 generated by time base 604 is supplied to a precision timing generator 608.

Precision timing generator 608 provides synchronization signal 610 to optional code generator 612. Precision timing generator 608 utilizes an optional code source output 614 from optional code generator 612, together with an internally generated subcarrier signal (which is also optional) and an information signal 616 provided by information source 620, to generate a modulated, coded timing signal 618.

Optional code generator 612 can comprise, for example, a storage device such as a random access memory (RAM), read only memory (ROM), or the like, for storing suitable PN codes and for outputting the PN codes a code signal. Alternatively, maximum length shift registers or other computational means can be used to generate the PN codes.

An information source 620 supplies information signal 616 to precision timing generator 608. Information signal 616 can be any type of intelligence, including, but not limited to, digital bits representing voice, data, imagery, or the like, analog signals, or complex signals.

A pulse generate 622 uses the modulated, coded timing signal 618 as a trigger to generate output pulses 626. Output pulses 626 are sent to a transmit antenna 624, which converts output pulses 626 into propagating electromagnetic pulses. The electromagnetic pulses shall be referred to as the emitted signal, and propagate to an impulse radio receiver 702, such as shown in FIG. 7. The emitted signal is wideband or ultrawide-band, approaching a monocycle pulse as shown in FIG. 1A. Thus, the bandwidth of emitted signal is much too great (e.g., 2 GHz) to fit into the 100 MHz bands that have been made available by the FCC at 5.15–5.25 GHz, 5.25–5.35 GHz and 5.725–5.825 GHz.

III.12. Exemplary Receiver

FIG. 7 shows an exemplary wide or ultra-wide band receiver 702 for use in an impulse radio communications system.

Receiver 702 includes an antenna 704 for receiving a propagated impulse radio signal. A received signal 708 is input to a cross correlator or sampler 710 to produce a baseband output 712.

Receiver 702 also includes a precision timing generator 714, which receives a periodic timing signal 716 from a receiver time base 718. Time base 718 is adjustable and controllable in time, frequency, or phase, as required by the lock loop in order to lock on the received signal 708. Precision timing generator 714 provides synchronization signal 720 to an optional code generator 722 and receives a code control signal 724 from optional code generator 722. Precision timing generator 714 utilizes periodic timing signal 716 and code control signal 724 to produce a coded timing signal 726. Pulse generator 728 (also referred to as a template generator) is triggered by coded timing signal 726 and produces a train of template signal pulses 730 ideally having waveforms substantially equivalent to each pulse of received signal 708. If code generator 722 is used, then the code for receiving a give signal is the same code utilized by the originating transmitter (e.g., used by code generator 614 of transmitter 602) to generate the propagated signal. Thus, the timing of template pulse train 730 matches the timing of received signal pulse train 708, allowing received signal 708 to be synchronously sampled by correlator 710. Correlator 710 ideally comprises a multiplier followed by a short term integrator to sum the multiplied product over the pulse interval.

Baseband output 712 of correlator 710 is coupled to an optional subcarrier demodulator 732, which demodulates the subcarrier information signal from the subcarrier. The purpose of the optional subcarrier process, when used, it to move the information signal away from DC (zero frequency) to improve immunity to low frequency noise and offsets. An output of the subcarrier demodulator is then filtered or integrated in a pulse summation stage 734. A sample and hold ~36 samples output 735 of pulse summation state 734 synchronously with the completion of the summation of a digital bit or symbol. An output of the sample and hold 736 is then compared with a nominal zero (or reference) signal output in a detector stage 738 to determine an output signal 739 representing the digital state of the output voltage of the sample and hold 736.

Baseband signal 712 is also input to a lock loop filter 742 (also referred to as a lowpass filter). A control loop comprising lock loop filter 742, time base 718, precision timing generator 714, template generator 728, and correlator 710 is used to generate an error signal 744. Error signal 744 provides adjustments to the adjustable time base 718 to time position periodic timing signal 726 in relation to the position of received signal 708.

IV. Preferred Embodiments

Above is an overview of impulse radio basics and an overview of the benefits of using impulse radio methods and systems. Typically, impulse radio systems are very wide or ultra wide band systems that utilize a bandwidth of, for example, 2 GHz. The present invention is directed to systems and methods for using impulse radio techniques to transmit information over narrower bands, of for example, 100 MHz, which shall be referred to as medium wide bands. Below are descriptions of impulse radio transmitters and receivers that respectively transmit and receive medium wide band signals according to the present invention.

IV.1. Sinusoidal Burst Position Modulation a. Transmitter

Figure 8:
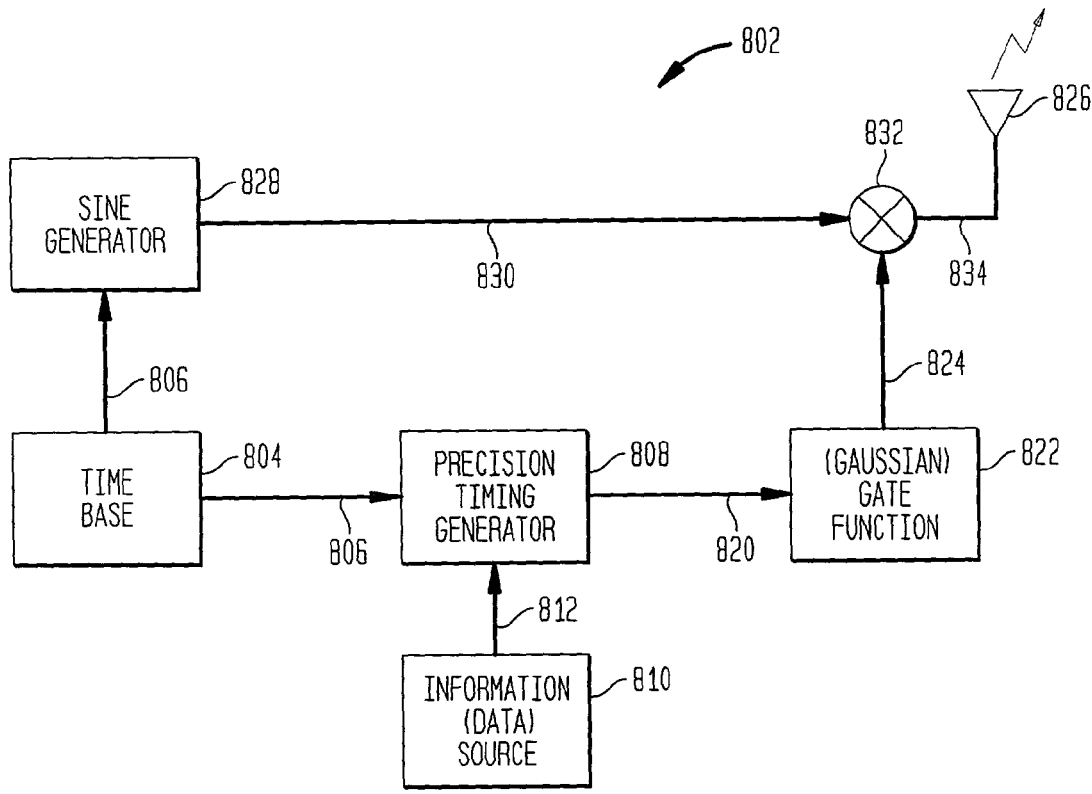
FIG. 8 is a functional diagram of a medium wide band impulse radio transmitter according to an embodiment of the present invention.

An exemplary embodiment of an impulse radio transmitter 802 used for medium wide band communications, according to an embodiment of the present invention, is described in FIG. 8.

Transmitter 802 comprises a time base 804 that generates a periodic timing signal 806. Time base 804 typically comprises a voltage controlled oscillator (VCOS), or the like, having a high timing accuracy and low jitter, on the order of picoseconds (psec). The voltage control to adjust the VCOS center frequency is preferably set at calibration to the desired center frequency used to define the transmitter's nominal pulse repetition rate. Periodic timing signal 806 is supplied to a precision timing generator 808. Periodic timing signal 806 is also provided to a sine generator 828, which is discussed below.

Precision timing generator 808 utilizes an internally generated subcarrier signal (which is optional) and an information signal 812 to generate a modulated timing signal 820. An information source 810 supplies information signal 812 to precision timing generator 808. Information signal 812 can be any type of intelligence, including, but not limited to, digital bits representing voice, data, imagery, or the like, analog signals, or complex signals.

An example of a preferred precision timing generator 808 is disclosed in U.S. patent application Ser. No. 09/146,524, entitled "Precision Timing Generator System and Method", which is assigned to the assignee of the present invention, and incorporated herein by reference in its entirety. Use of a subcarrier signal is disclosed in U.S. Pat. No. 5,677,927, entitled "Ultrawide-Band Communication System and Method", which is also assigned to the assignee of the present invention and incorporated herein by reference in its entirety.

Gate function generator 822 uses modulated timing signal 820 (also referred to as time dither signal 820, or trigger signal 820) as a trigger to generate output pulses 824. Gate function generator 822 preferably outputs Gaussian shaped pulses 1002, as shown in FIG. 10B, having the following function:

$$f_w(t) = e^{\frac{-t^2}{\sigma^2}}$$

Where,

σ is a time scaling parameter, t is time, e is the natural logarithm base, and $f_w(t)$ is the waveform voltage.

Figure 9:
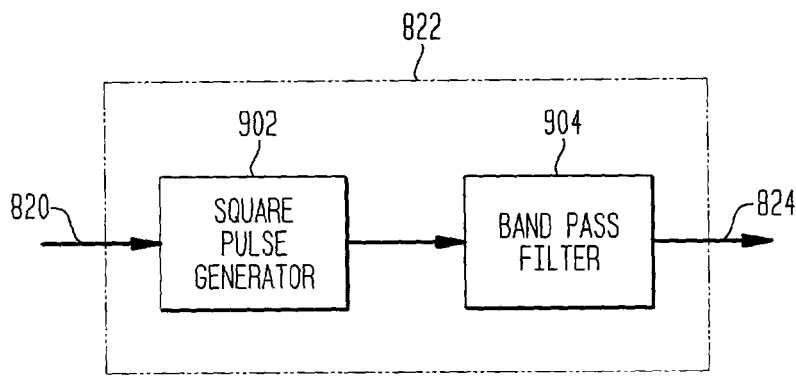
FIG. 9 is a functional diagram of a gate function generator according to an embodiment of the present invention.

These Gaussian pulses 1002 can be produced using bandpass filters that are known in the art. For example, in one embodiment, shown in FIG. 9, gate function generator 822 consists of a square pulse generator 902 (that generates on-off pulses) followed by a bandpass filter 904, such as a Bessel filter. Of course, Gaussian pulses 1002 can be produced by any other appropriate apparatus and method. Any practical implementation will deviate from the ideal mathematical model by some amount. In fact, this deviation from ideal may be substantial and yet yield a system with acceptable performance. These mathematical models are provided as an aid to describing ideal operation and are not intended to limit the invention. Gaussian shaped pulses are preferred over square wave pulses, because Gaussian shaped pulses are compact in both time and frequency domains.

In another embodiment, not shown, gate function generator 822 simply consists of a square pulse generator (that generates on-off pulses). In such an embodiment, the frequency domain spectrum can be controlled by band pass filtering the sinusoidal bursts that are output by multiplier 832. For example, referring to FIG. 8, this can be accomplished by adding the appropriate band pass filter between mixer 832 and antenna 826. This can be applied to all the embodiments discussed in this specification.

Gate function generator 822 can adjust the width of Gaussian pulses 1002. The width of each Gaussian pulse 1002 is chosen such that output signal 824 has a desired bandwidth. The bandwidth of output signal 824 is approximately equal to the reciprocal of the width of each Gaussian pulse 1002. As discussed above, an object of the present invention is to utilize available medium wide bands. Examples of these medium wide bands include, but are not limited to, the 100 MHz bands at 5.15–5.25 GHz, 5.25–5.35 GHz and 5.725–5.825 GHz, that have been made available for U-NII devices. Thus, if the desired bandwidth were 100 MHz wide, then the pulse width of each Gaussian pulse should be 10 nsec (i.e., $1/(10 \times 10^{-9}) = 100 \times 10^6 = 100$ MHz).

Figure 13:
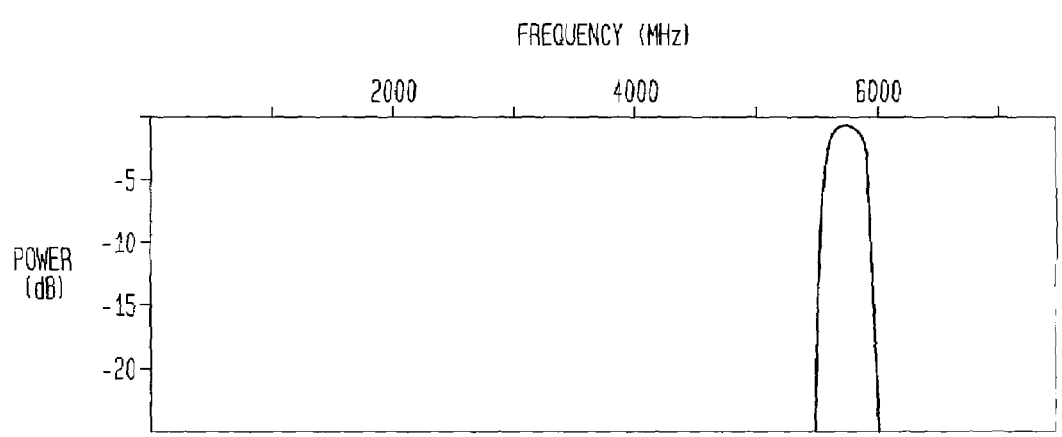
FIG. 13 shows a 5.775 GHz center frequency medium wide band signal in the frequency domain, in accordance with the present invention.

In order to place the train of Gaussian pulses 824 within the desired 100 MHz band (e.g., the 5.725–5.825 band), signal 824 is multiplied by a sinusoidal signal 830, wherein the frequency of sinusoidal signal 830 dictates the center frequency of a resulting train of sinusoidal bursts 834. Thus, if the desired center frequency is 5.775 GHz, then sinusoidal signal 830 should have a frequency of 5.775 GHz. An example frequency domain spectrum of signal 834 is shown in FIG. 13, wherein signal 834 is created by multiplying a train of 10 nsec wide Gaussian pulses 1002 with a sinusoidal signal 830 having a 5.775 GHz frequency. More specifically, multiplier 832 (also referred to as mixer 832) multiplies sinusoidal signal 830 with pulse train 824 to produce output signal 834, which consists of a train of sinusoidal bursts. Accordingly, output signal 834 is also referred to as a train of sinusoidal bursts. In the preferred embodiment where gate function generator produces Gaussian pulses 1002, output signal 834 consists of Gaussian shaped sinusoidal bursts 1004 (also referred to as Gaussian envelopes 1004), as shown in FIG. 10D. Each of these Gaussian envelopes 1004 includes multiple zero crossings. The number of zero crossings in each Gaussian envelope 1004 depends on the frequency of sinusoidal signal 830 (e.g., 5.775 GHz) and the pulse width of each Gaussian pulse (e.g., 10 nsec).

Sinusoidal signal 830, which is generated by sine generator 828, has the following function:

$$f_w(t) = \sin(2\pi f_c t)$$

Where,
t is time,
$f_c$ is the frequency of sinusoidal signal 830, and
$f_w(t)$ is the waveform voltage.

As discussed above, the function of each of the Gaussian pulses 1002 generated by gate function generator 822 is:

$$f_w(t) = e^{\frac{-t^2}{\sigma^2}}$$

Accordingly, in the embodiment where gate function generator 822 outputs Gaussian pulses 1002, the function of each sinusoidal burst of output signal 834 is:

$$f_w(t) = \sin(2\pi f_c t) e^{\frac{-t^2}{\sigma^2}}$$

Where,
$\sigma$ is a time scaling parameter,
t is time,
e is the natural logarithm base,
$f_c$ is the frequency of the sinusoidal signal 830, and
$f_w(t)$ is the waveform voltage.

An example frequency domain spectrum of the above waveform is shown in FIG. 13. The corresponding equations is:

$$F_w(f) = e^{-2(\pi\sigma(f-f_c))^2}$$

It is noted that this equation uses a Gaussian envelope gating function to provide a near optimum balance between time domain short pulse length and frequency domain contained bandwidth. In some cases it may be desirable to modify these properties by filtering or modifying the envelope shape. In particular, it may be desirable to provide steeper frequency domain skirts or flatter frequency domain spectral density in the occupied bandwidth. Such modifications will usually result in a longer time domain pulse, especially at the attenuation skirts.

Output signal 834 is then converted into propagating electromagnetic sinusoidal bursts by the transmit antenna 826. The propagated sinusoidal bursts can be received by an impulse radio receiver 1202, which is described in the discussion of FIG. 12 below.

Figure 10A:
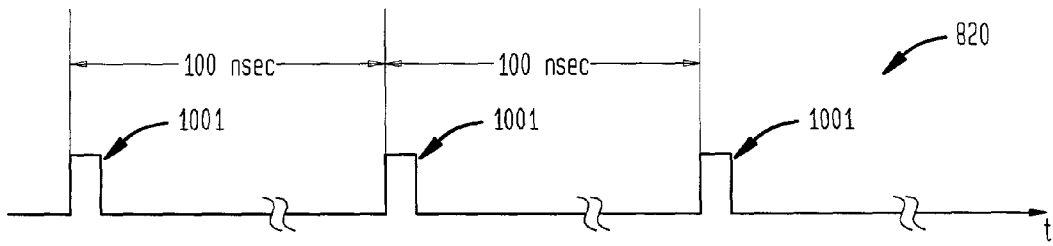
FIGS. 10A–10D illustrate signal waveforms that are useful in explaining an embodiment of the present invention.
Figure 10B:
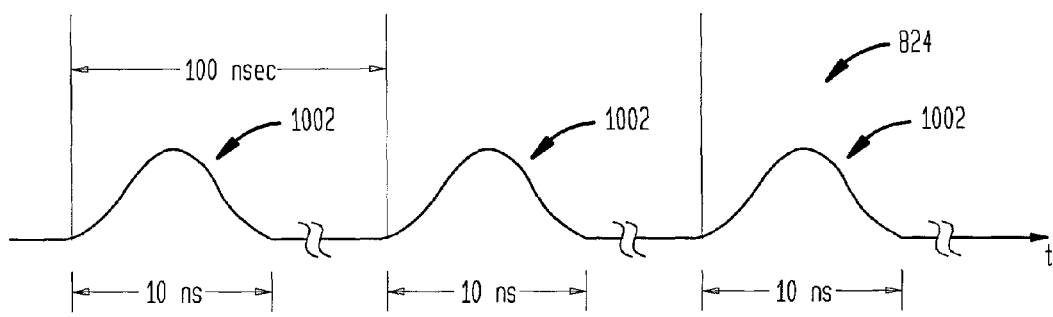
Figure 10C:
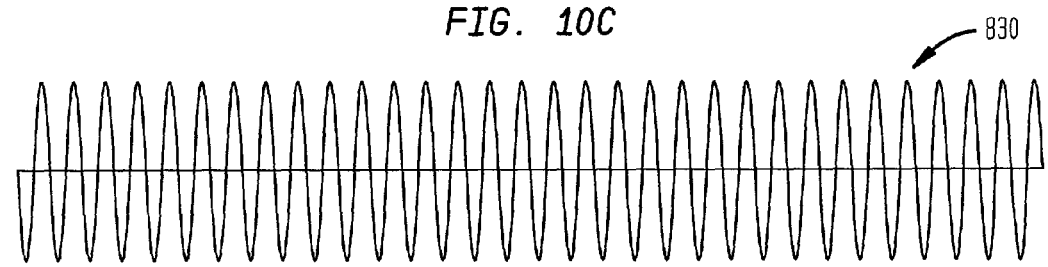
Figure 10D:
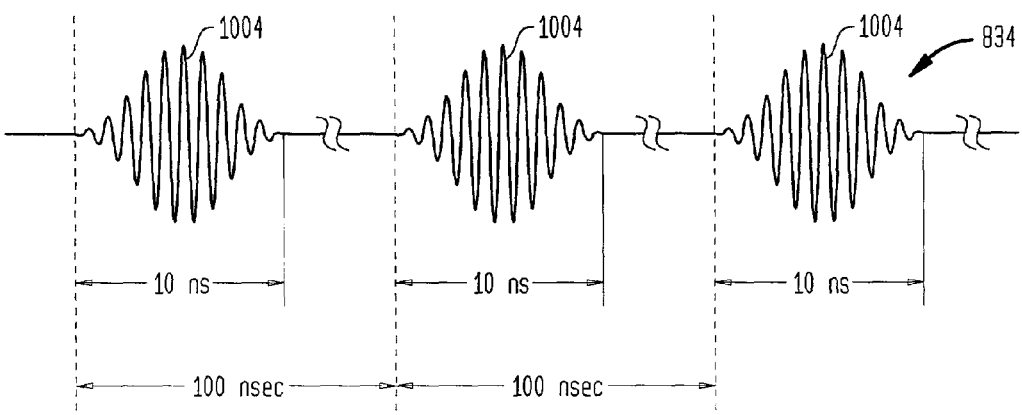

FIGS. 10A–10D are used to further illustrate the operation of medium wide band impulse radio transmitter 802. FIG. 10A shows a portion of an example modulated timing signal 820 (also referred to as trigger signal 820) that triggers gate function 822. FIG. 10B shows a portion of an example signal 824, consisting of a train of Gaussian pulses 1002, that is output from gate function generator 822. FIG. 10C shows a portion of an example sinusoidal signal 830 that is generated by sine generator 828. Finally, FIG. 10D shows a portion of an example output signal 834 of multiplier 832. That is, FIG. 10D shows how multiplying Gaussian pulse train signal 824 with sinusoidal signal 830 produces output signal 834, which comprises Gaussian envelopes 1004 (also referred to as sinusoidal bursts). It is noted that the figures throughout this specification are not necessarily drawn to scale. For example, there are probably significantly more zero crossings within each sinusoidal burst 1004 than shown in FIG. 10D.

The 10 nsec width of Gaussian envelopes 1004 is representative of a desired bandwidth of the medium wide band output signal 834. In one embodiment, the position of each transmitted envelope is a function of the data being transmitted. Examples of this are described below.

Without any modulation, transmitter 802 will output a signal 834 consisting of a periodic (i.e., evenly spaced) series of Gaussian shaped sinusoidal bursts 1004. More specifically, without any time shift modulation, precision timing generator 808 will output a signal 820 consisting of periodic series of triggering pulses 1001 spaced at a predefined time interval (e.g., 100 nsec), as shown in FIG. 10A. This in turn causes gate function generator 822 to output a signal 824 consisting of a periodic series of Gaussian pulses 1002 (i.e., in an embodiment where gate function generator 822 outputs Gaussian pulses). Multiplier 832, multiplies this periodic series of Gaussian pulses (i.e., signal 824) with sinusoidal signal 830, thereby creating a signal 834 composed of a periodic (i.e., evenly spaced) train of Gaussian shaped sinusoidal bursts 1004 that are transmitted by antenna 826. FIG. 11A is a diagram illustrating an example of an unmodulated train of sinusoidal bursts in the time domain.

In the example illustrated in FIG. 11A, sinusoidal bursts 1004 are timed such that one occurs each 100 nsec period (i.e., $T_f$=100 nsec). Of course, other periods can be chosen. In this document, the period is referred to as a frame. Thus, in FIG. 11A, each frame is 100 nsec long.

In an embodiment where one sinusoidal burst occurs every 100 nsec, signal 834 has a sinusoidal burst repetition frequency of 10 megaburst per second (Mbstps, where each magaburst is 106 sinusoidal bursts). As shown in FIG. 11B, which illustrates an unmodulated signal 834 in the frequency domain, this highly regularized train of sinusoidal bursts produces energy spikes (comb lines 1102) at ten MHz intervals.

Modulation techniques can be used to impart information on the train of Gaussian shaped sinusoidal bursts. This can be done with AM, FM, pulse position modulation, and other methods. In a preferred embodiment, pulse position modulation (also referred to as time shift modulation) is used to alter the time at which the sinusoidal bursts 1004 are positioned. Referring to FIGS. 8–11A, pulse position modulation can be implemented by shifting a time position of each Gaussian envelope 1004 in response to information signal 812. This is accomplished by altering the precise times at which precision timing generator 808 sends a triggering pulses 1001 (of trigger signal 820) to gate function generator 822. In this embodiment, the amount of time shift of each pulse from its respective time base clock position is dependant upon information signal 812.

Figure 11C:
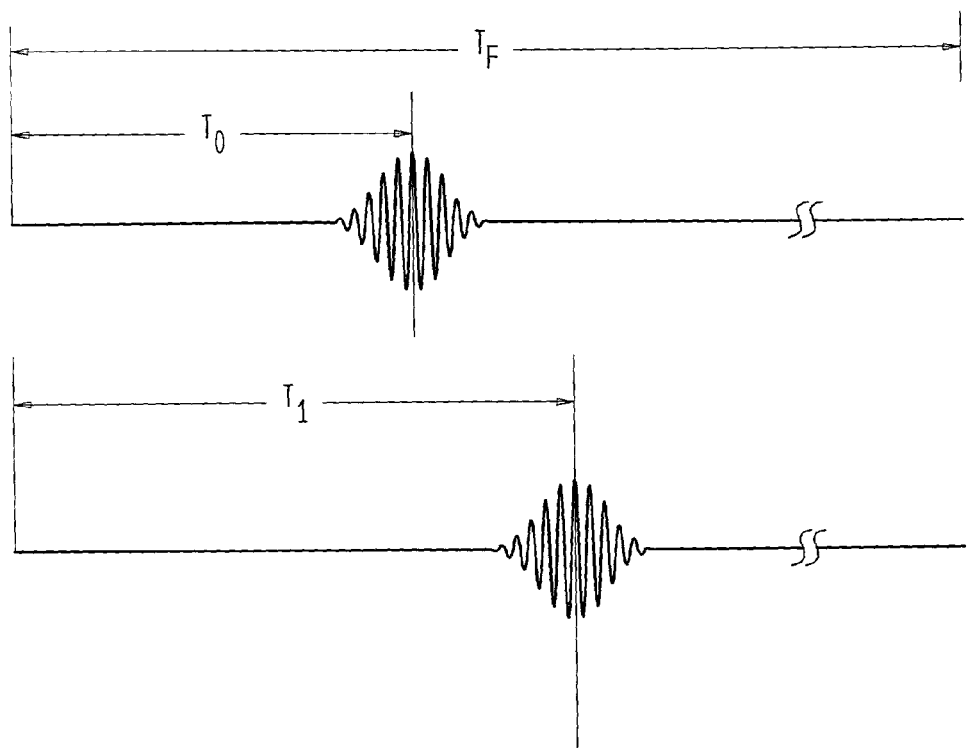
FIG. 11C illustrates a sinusoidal burst having a nominal position offset and a sinusoidal burst having a specified position offset.

For example, referring to FIG. 11C, $T_0$ is the nominal sinusoidal burst position. $T_1$ is a sinusoidal burst with its position offset due to modulation. In one embodiment, for example, transmitter 802 can transmit a sinusoidal burst at position $T_0$ for data=0 and at $T_1$ for data=1. For this to work, precision timing generator 808 must be capable of providing timing to much greater precision than the modulation time shift in order to maintain good signal to noise. This is just one example of a modulation scheme that can be used with the present invention. It will be apparent to persons skilled in the relevant art that various other modulation schemes can be used without departing from the spirit and scope of the present invention.

Additional benefits can be obtained by using more than one sinusoidal burst to represent one digital information bit. For example, 100 sinusoidal bursts can be used to represent each digital information bit. The received signal from the ensemble of sinusoidal bursts associated with each bit is combined in a process referred to as integration gain. The combination process is basically the summation of the received signal plus noise energy associated with each sinusoidal burst over the number of sinusoidal bursts for each bit. The voltage signal-to-noise ratio improves roughly by the square root of the number of sinusoidal bursts summed. Proper summation requires that the timing be stable and accurate over the entire integration (summing) time.

The frequency of sinusoidal signal 830 and the burst width of Gaussian pulses 1002 are implementation specific. That is, the frequency of sinusoidal signal 830 is selected to provide a desired center frequency and the width of Gaussian pulses 1002 are chosen to provide a desired bandwidth.

Based on the above examples and the entire disclosure, a person skilled in the art could adopt the teachings to other medium wide frequency bands. For example, to create a signal 834 having a bandwidth of 200 MHz centered at 10 GHz, the width of each Gaussian pulse 1002 should be 5 nsec (i.e., $1/(5 \times 10^{-9})$=200×$10^6$=200 MHz), and the frequency of sinusoidal signal 830 should be 10 GHz. In another example, to create a signal 834 having a bandwidth of 80 MHz centered at 2.4 GHz, the width of each Gaussian pulse 1002 should be 12.5 nsec, and sinusoidal signal 830 should have a frequency of 2.4 GHz.

The sinusoidal bursts (also referred to as bursts of cycles) of the present invention can be produced by techniques described above or by other techniques available to the designer. Any practical implementation will deviate from the ideal mathematical model by some amount, which may be considerable since impulse radio systems can tolerate seemingly considerable deviation with acceptable consequences.

These mathematical models are provides as an aid to describing the ideal operation and are not intended to limit the invention to such a precise degree. Other bursts of cycles that adequately fill a given bandwidth and has adequate on off attenuation ratio for a given application are envisioned according this invention.

b. Receiver

Figure 12:
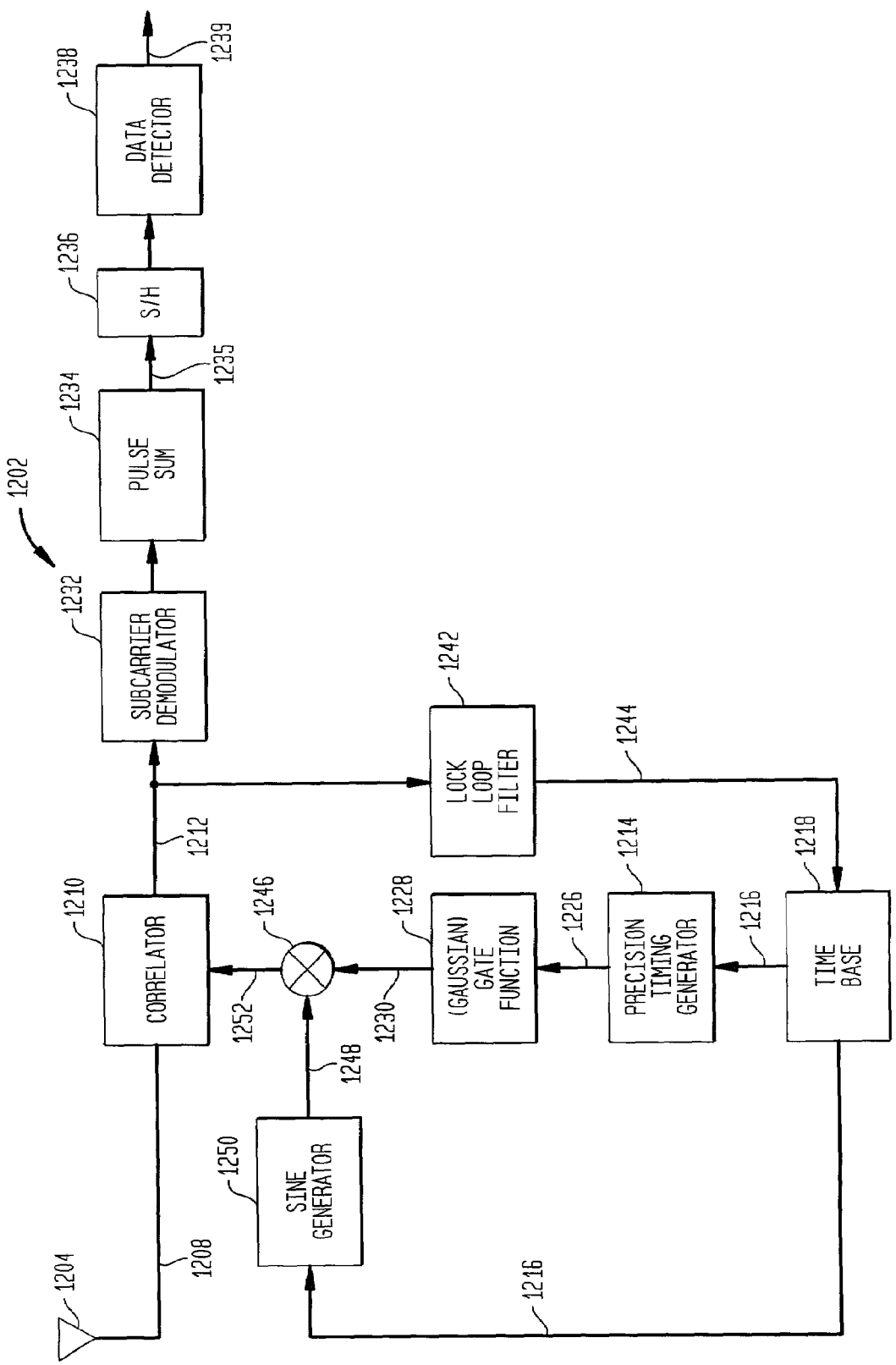
FIG. 12 is a functional diagram of a medium wide band impulse radio receiver according to an embodiment of the present invention.

FIG. 12 shows an impulse radio receiver 1202 according to an embodiment of the present invention.

Receiver 1202 includes an antenna 1204 for receiving a propagated impulse radio signal. A received signal 1208 is input to a cross correlator (also called a sampler 1210) to produce a baseband output 1212.

Receiver 1202 also includes a precision timing generator 1214, which receives a periodic timing signal 1216 from a time base 1218. Time base 1218 is adjustable and controllable in time, frequency, or phase, as required by a lock loop (described below) in order to lock on the received signal 1208. Precision timing generator 1214 utilizes periodic timing signal 1216 to produce a precise timing signal 1226 (also referred to as trigger signal 1226). Time base 1218 also provides periodic timing signal 1216 to sine generator 1250.

Gate function generator 1228 is triggered by precise timing signal 1226 (also referred to as trigger signal 1226), and outputs a signal 1230 that preferably consists of Gaussian pulses. Multiplier 1246 multiplies a pulse train output 1230 of gate function generator 1228 with a sinusoidal signal 1248 generated by sine generator 1250 to produce a template signal 1252 that consists of a train of sinusoidal bursts ideally having waveforms substantially equivalent to each sinusoidal burst of received signal 1208. Sinusoidal signal 1248 has the same frequency as the sinusoidal signal (i.e., signal 830 of transmitter 802) that was used to generate received signal 1208. Thus, the timing of template signal 1252 matches the timing of received signal 1208, allowing received signal 1208 to be synchronously sampled by correlator 1210. Correlator 1210 ideally comprises a multiplier followed by a short term integrator to sum the multiplied product over the pulse interval.

Baseband output 1212 of correlator 1210 is coupled to an optional subcarrier demodulator 1232, which demodulates the optional subcarrier information signal from the subcarrier. One of the purposes of the optional subcarrier process, when used, is to move the information signal away from DC (zero frequency) and thereby improves immunity to low frequency noise and offsets. An output of subcarrier demodulator 1232 is then filtered or integrated in a pulse summation stage 1234. A sample and hold 1236 samples output 1235 of pulse summation stage 1234 synchronously with the completion of the summation of a digital bit or symbol. An output of sample and hold 1236 is then compared with a nominal zero (or reference) signal output in a detector stage 1238 to determine an output signal 1239 representing the digital state of the output voltage of sample and hold 1236. Additional details of the subcarrier technique is disclosed in U.S. Pat. No. 5,677,927, which was incorporated by reference above.

Baseband signal 1212 is also input to a lock loop filter 1242, which in one embodiment is a lowpass filter. A control loop comprising lock loop filter 1242, time base 1218, precision timing generator 1214, gate function generator 1228, and correlator 1210 is used to generate an error signal 1244. Error signal 1244 provides adjustments to adjustable time base 1218 to time position periodic timing signal 1226 in relation to the position of received signal 1208 for accurate cross correlation.

IV.2. Sinusoidal Burst Position Modulation with Coding

If sinusoidal bursts 1004 are transmitted at substantially regular frame intervals, they will give rise to a comb line spectrum where each line may contain too much concentrated spectral power, as shown in FIG. 11B. To avoid this, the sinusoidal bursts can be transmitted at random or pseudo-random intervals within the frame to "randomize" the position of each sinusoidal burst and thereby spread the comb lines to smooth the spectrum. Accordingly, in another embodiment, pseudo-random codes (also referred to as PN codes) are used to smooth the spectrum.

a. Transmitter

Figure 14:
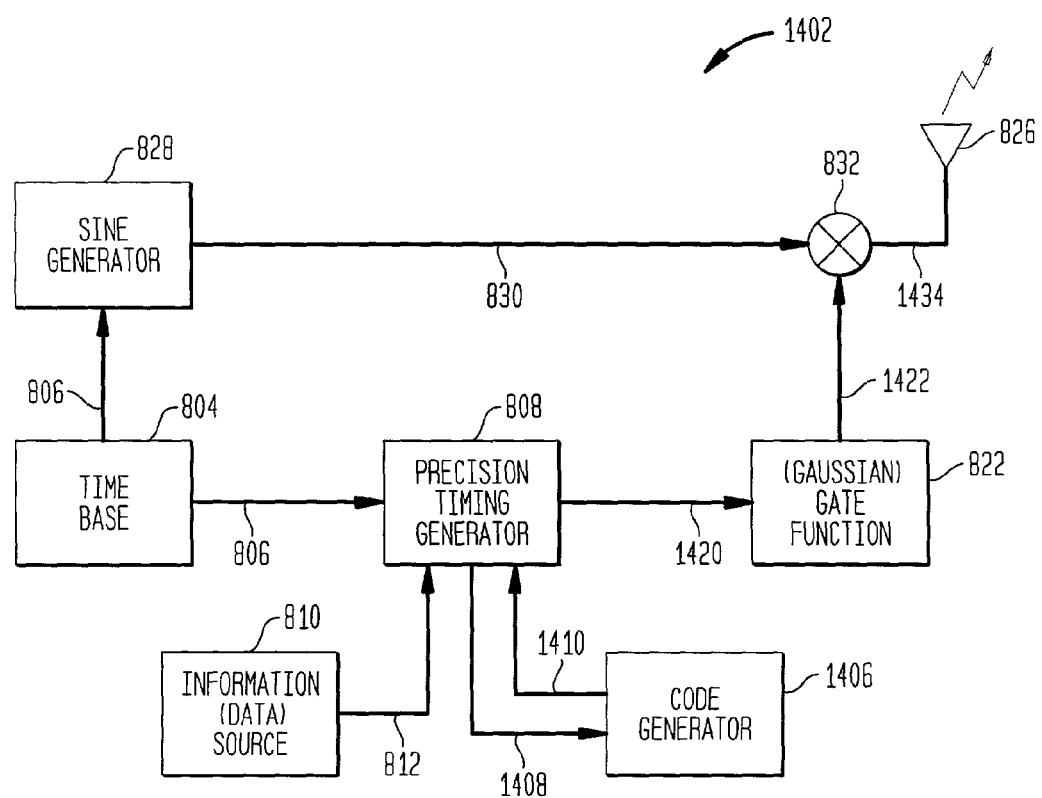
FIG. 14 is a functional diagram of a medium wide band impulse radio transmitter that uses coding, according to an embodiment of the present invention.

As shown in FIG. 14, a transmitter 1402 includes a code generator 1406 that is used to code the output of precision timing generator 808. In such an embodiment, precision timing generator 808 supplies synchronizing signal 1408 to a code generator 1406 and utilizes the code source output 1410 together with an internally generated subcarrier signal (which is optional) and an information signal 812 to generate an information and code modulated timing signal 1420.

The code generator 1406, also referred to as a code source, comprises a storage device such as a random access memory (RAM), read only memory (ROM), or the like, for storing suitable PN codes and for outputting the PN codes as a code signal 1408. Alternatively, maximum length shift registers or other computational means can be used to generate the PN codes.

Information and code modulated timing signal 1420 can be thought of as including both an information component and a coding component. Thus, pulse train signal 1422 generated by gate function 822 (which is triggered by signal 1420) can be though of as having both an information component (i.e., a position shift due to information signal 812) and coding component (i.e., a position shift due to coding signal 1410).

Multiplier 832 multiplies signal 1422 with sinusoidal signal 830 and outputs a signal 1434 that consists of an information and code time shifted train of sinusoidal bursts. As discussed above, the bandwidth of signal 1434 is dependent on the width of each sinusoidal burst. Also, as discussed above, the center frequency of the frequency band of signal 1434 is dependent on the frequency of sinusoidal signal 830.

Thus, the bandwidth and center frequency of signal 1434 can be controlled, respectively, by adjusting the width of the Gaussian pulses in Gaussian pulse train signal 1422 and by adjusting the frequency of sinusoidal signal 830.

Thus, when output signal 1434 is coded, as discussed above, modulation is implemented by essentially code time shifting each Gaussian envelope 1004 in response to coding signal 1410 and information shifting each Gaussian envelope 1004 by an additional amount (that is, in addition to a PN code dither) in response to information signal 812. Of course other methods of coding and information modulation are within the spirit and scope of the present invention.

If multiple (e.g., 100) sinusoidal bursts are to be transmitted for each bit of information, then preferably the information component for the multiple (e.g., 100) sinusoidal bursts will be the same while the coding component will change on a burst by burst basis. The effect of using codes to vary the time shift on a burst by burst basis is to assist in spreading the energy distribution of signal 1434 in the frequency domain. Additionally, if the PN codes of code generator 1406 are designed to have low cross correlation such that a train of sinusoidal bursts using one code will seldom collide with a train of sinusoidal bursts using another code, then code generator 1406 can also be used for establishing independent communication channels.

b. Receiver

Figure 15:
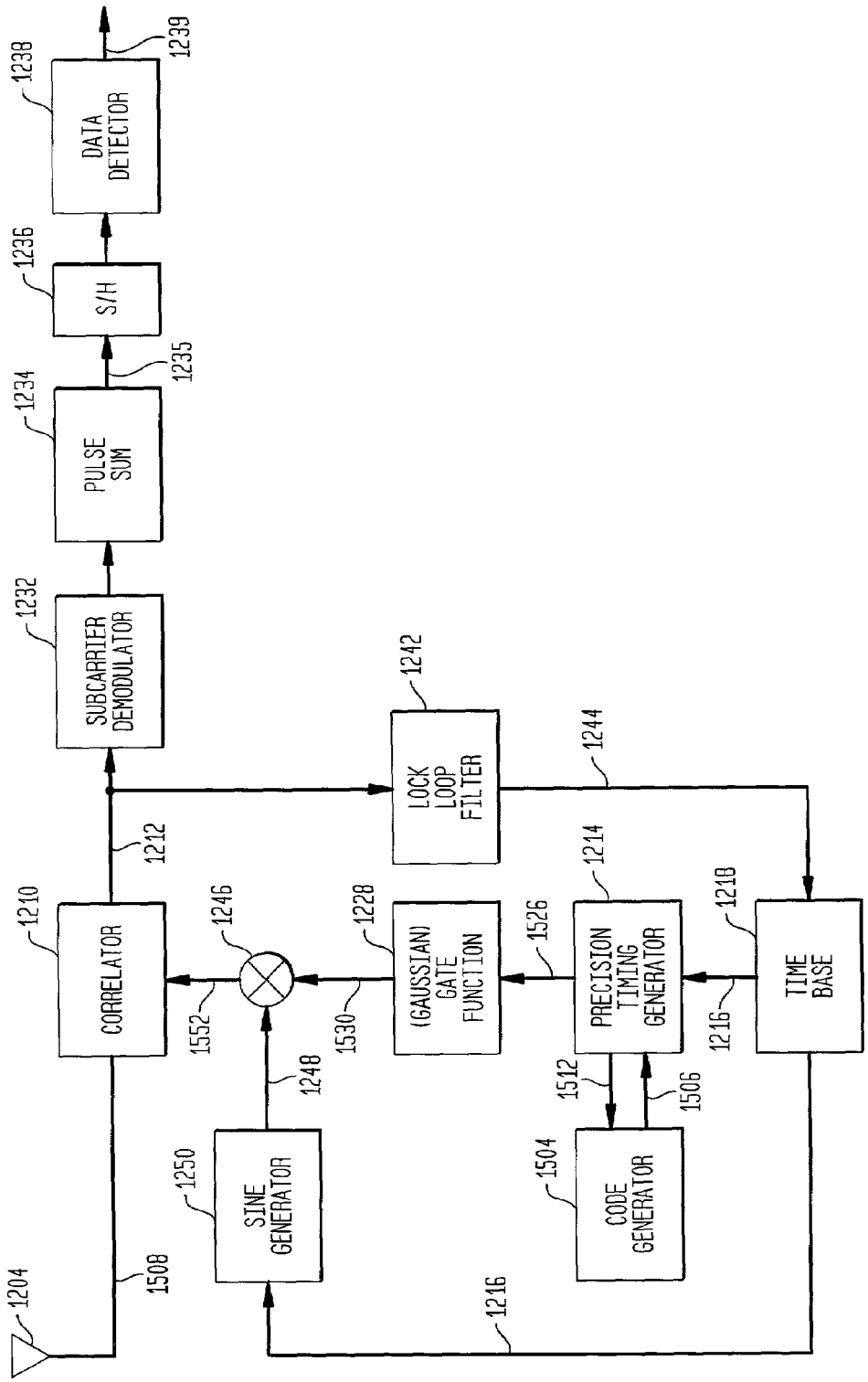
FIG. 15 is a functional diagram of a medium wide band impulse radio receiver that can receive coded medium wide band signals, according to an embodiment of the present invention.
Figure 16:
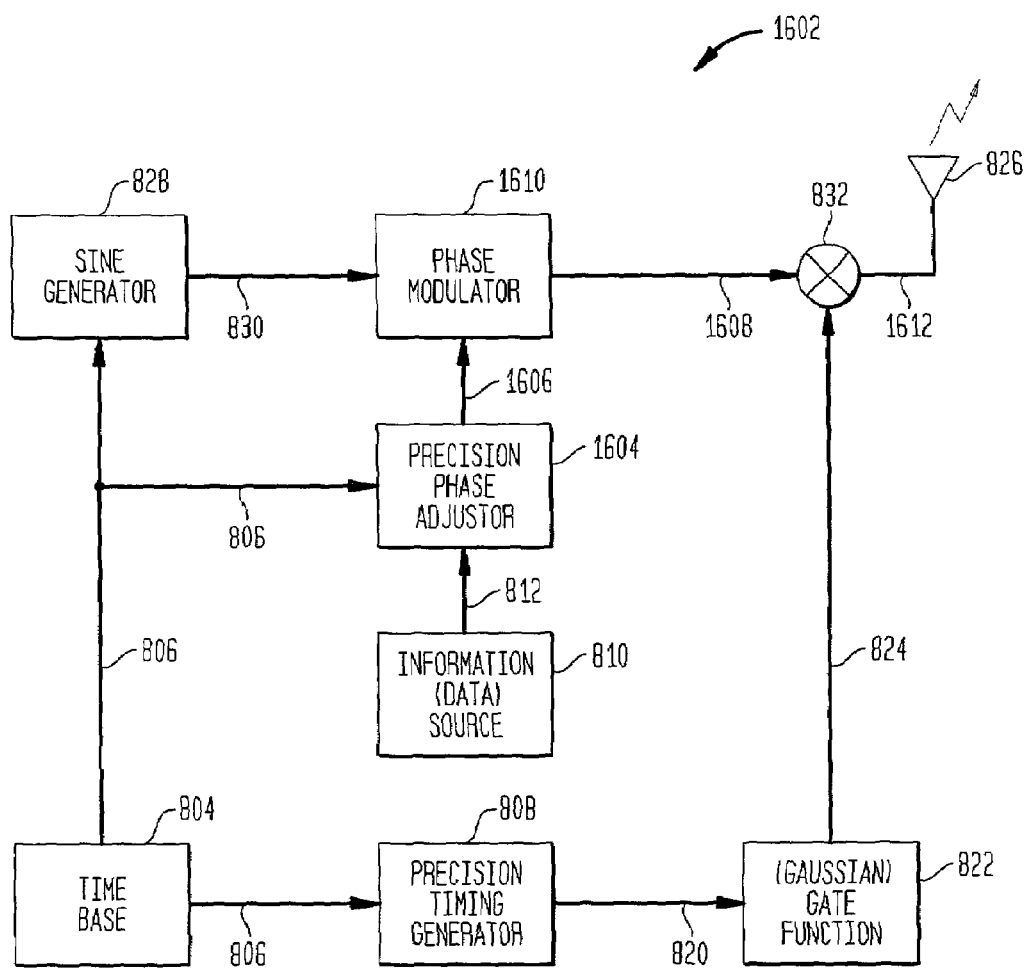
FIG. 16 is a functional diagram of a medium wide band impulse radio transmitter that uses phase modulation, according to an embodiment of the present invention.

FIG. 15 shows an impulse radio receiver 1502, according to an embodiment of the present invention, that can decode received coded signal. Receiver 1502 includes an antenna 1204 for receiving a propagated impulse radio signal. A received coded signal 1508 is input to a cross correlator (also called a sampler 1210) to produce a baseband output 1212.

Receiver 1502 also includes a precision timing generator 1214, which receives a periodic timing signal 1216 from a time base 1218. Time base 1218 is adjustable and controllable in time, frequency, or phase, as required by a lock loop (described below) in order to lock on the received coded signal 1508. Precision timing generator 1214 provides synchronization signal 1512 to code generator 1504 (which is required since the received signal 1508 is coded) and receives a code control signal 1506 from code generator 1504. Precision timing generator 1214 utilizes periodic timing signal 1216 and code control signal 1506 to produce a coded timing signal 1526 (also referred to as a coded trigger signal 1526).

Gate function generator 1228, which preferably produces Gaussian pulses, is triggered by coded timing signal 1526. Multiplier 1246 multiplies a coded pulse train output signal 1530 (of gate function generator 1228) with a sinusoidal signal 1248 generated by sine generator 1250. Multiplier 1246 outputs a template signal 1552 consisting of a train of sinusoidal bursts ideally having waveforms substantially equivalent to each sinusoidal burst of received coded signal 1508. The code used for receiving a given signal is the same code utilized by the originating transmitter (e.g., used by code generator 1406 of transmitter 1402) to generate the propagated signal (i.e., received coded signal 1508). Additionally, sinusoidal signal 1248 has the same frequency as the sinusoidal signal 830 that was used to generate received coded signal 1508. Thus, the timing of template signal 1552 matches the timing of received coded signal 1508, allowing received coded signal 1508 to be synchronously sampled by correlator 1210. Correlator 1210 ideally comprises a multiplier followed by a short term integrator to sum the multiplied product over the pulse interval.

Baseband output 1212 of correlator 1210 is coupled to an optional subcarrier demodulator 1232, which demodulates the optional subcarrier information signal from the subcarrier. One of the purposes of the optional subcarrier process, when used, is to move the information signal away from DC (zero frequency) and thereby improves immunity to low frequency noise and offsets. An output of subcarrier demodulator 1232 is then filtered or integrated in a pulse summation stage 1234. A sample and hold 1236 samples output 1235 of pulse summation stage 1234 synchronously with the completion of the summation of a digital bit or symbol. An output of sample and hold 1236 is then compared with a nominal zero (or reference) signal output in a detector stage 1238 to determine an output signal 1239 representing the digital state of the output voltage of sample and hold 1236.

Baseband signal 1212 is also input to a lock loop filter 1242, which in one embodiment is a lowpass filter. A control loop comprising lock loop filter 1242, time base 1218, precision timing generator 1214, gate function generator 1228, and correlator 1210 is used to generate an error signal 1244. Error signal 1244 provides adjustments to adjustable time base 1218 to time position periodic timing signal 1226 in relation to the position of received signal 1508 for accurate cross correlation and decoding.

IV.3. Sinusoidal Burst Phase Shift Modulation

In an alternative embodiment, rather than time positioning the sinusoidal bursts, modulation can be performed by phase shifting the sinusoidal bursts.

a. Transmitter

In this embodiment, a transmitter 1602 includes a precision timing generator 808 receives a periodic timing signal 806 from time base 804 and outputs a signal 820 consisting of a periodic (i.e., evenly spaced) series of triggering pulses spaced at a predefined time interval. Signal 820 is received by gate function generator 822, which in turn outputs signal 824, which is a periodic (i.e., evenly spaced) train of pulses (preferably Gaussian pulses). Information signal 812 is provided to a precision phase adjustor 1604. Precision phase adjustor 1604 sends a phase adjustment signal 1606 to phase modulator 1610, which adjusts the phase of sinusoidal signal 830. Phase modulator 1610 outputs a phase modulated sinusoidal signal 1608. Multiplier 832 multiplies phase modulated sinusoidal signal 1608 with signal 824. Since time position modulation is not used in this embodiment, signal 824 is a periodic train of Gaussian pulses (that is, the Gaussian pulses are evenly spaced apart from one another). Multiplier 832 outputs a signal 1612 consisting of a periodic (i.e., evenly spaced) train of phase modulated Gaussian shaped sinusoidal bursts. Signal 1612 is then transmitted by antenna 826.

More specifically, phase modulator 1610 produces a phase shifted sinusoidal signal 1608 having the following function:

$$f_w(t) = \sin(2\pi f_c t + \Phi)$$

Where, t is time, $\Phi$ is the phase offset specified by information signal 812, $f_c$ is the frequency of the sinusoidal signal 830, and $f_w(t)$ is the waveform voltage.

As discussed above, in an embodiment where gate function generator 822 outputs a signal 824 consisting Gaussian shaped pulses, each Gaussian shaped pulse has the following function:

$$f_w(t) = e^{\frac{-t^2}{\sigma^2}}$$

Accordingly, in this embodiment each sinusoidal burst of output signal 1612 has the following function:

$$f_w(t) = \sin(2\pi f_c t + \phi)e^{\frac{-t^2}{\sigma^2}}$$

Where, $\sigma$ is a time scaling parameter, t is time, e is the natural logarithm base, $\Phi$ is the phase offset specified by code generator 1106, $f_c$ is the frequency of the sinusoidal signal 830, and $f_w(t)$ is the waveform voltage.

Figure 17:
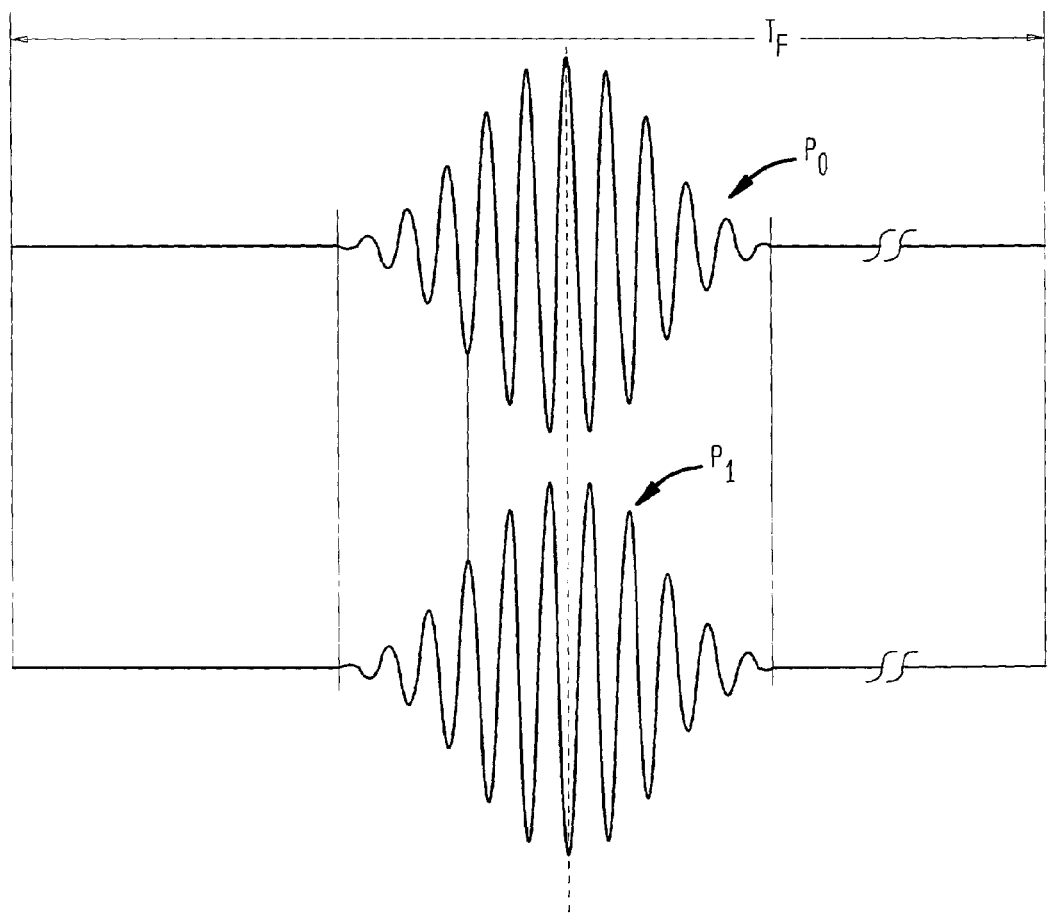
FIG. 17 illustrates exemplary sinusoidal bursts that are useful in explaining an embodiment of the present invention.

As discussed above, in this embodiment modulation is accomplished by adjusting a phase offset (i.e., $\Phi$) of sinusoidal signal 830. For example, referring to FIG. 17, assume that $P_0$ is a nominal sinusoidal phase and that $P_1$ is the nominal sinusoidal phase plus a phase offset of 180 degrees (i.e., $\Phi$=180 degrees). In one embodiment, for example, transmitter 1602 can transmit a sinusoidal burst(s) having a phase of $P_0$ for data=0, and a sinusoidal burst(s) having a phase of $P_1$ for data=1.

Figure 18:
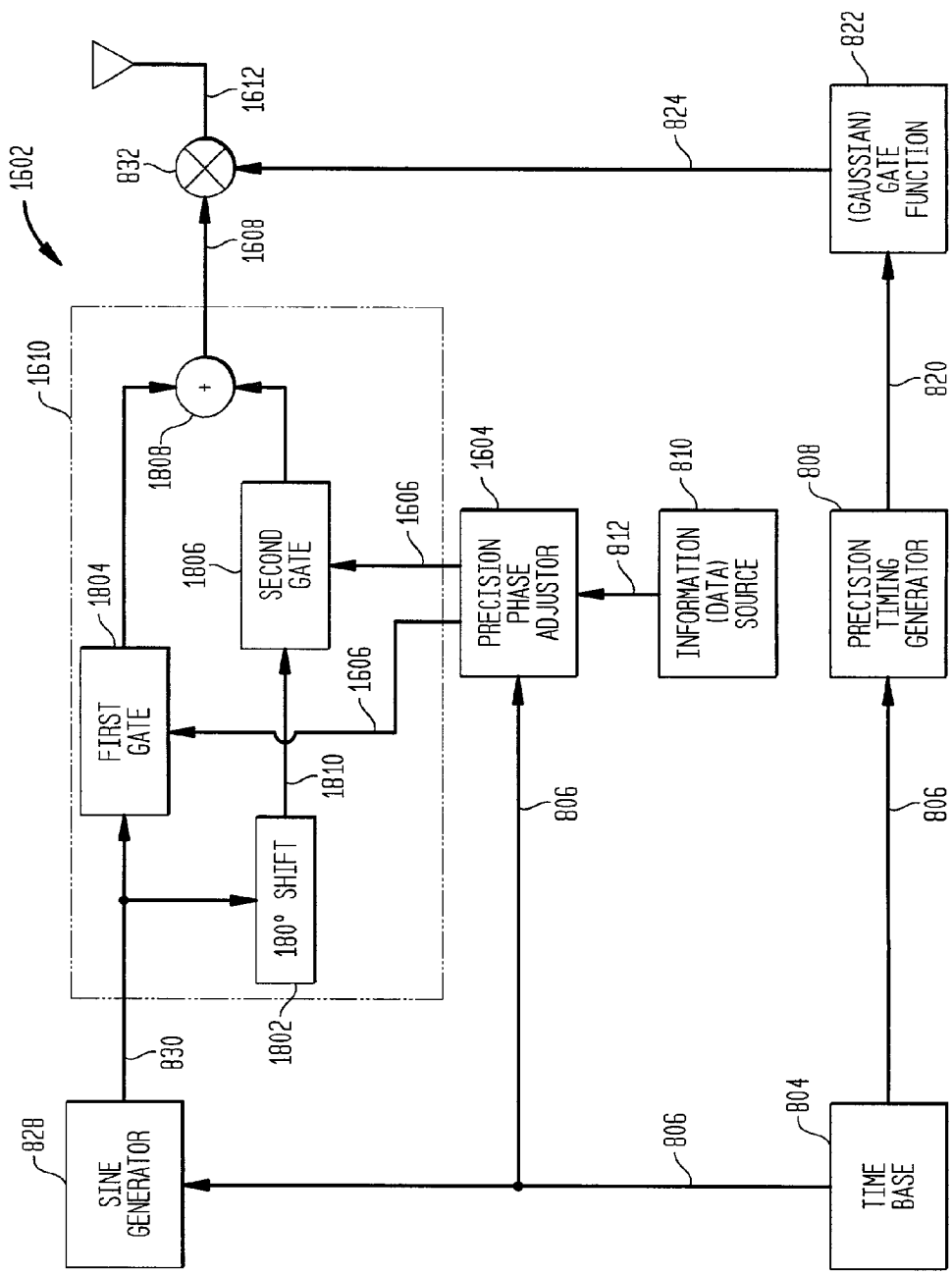
FIG. 18 illustrates a functional diagram of a medium wide band impulse radio transmitter that uses phase modulation, according to a specific embodiment of the present invention.

An example of a simple implementation of this embodiment is shown in FIG. 18. As shown, sinusoidal signal 830 is provided to a first gate 1804. Sinusoidal signal 830 is also provided to a 180 degree phase shifting circuit 1802, which outputs a 180 degree phase shifted sinusoidal signal 1810 that is provided to a second gate 1806. In this embodiment, precision phase adjustor 1604 simply indicates (i.e., selects) which gate 1804 or 1806 should be activated. When first gate 1804 is activated, it allows sinusoidal wave 830 to proceed to adder 1808. When second gate 1806 is activated, it allows 180 degree shifted sinusoidal signal 1810 to proceed to adder 1808. In this implementation, first gate 1804 and second gate 1806 are never activated at the same time. Rather, precision phase adjustor 1604 receives information signal 812, and determines (based on information signal 812) whether to activate gate 1804 or gate 1806. Depending on which gate 1804 or 1806 is activated, summer 1808 will receive sinusoidal signal 830 from first gate 1804 and no signal from second gate 1806, or summer 1808 will receive no signal from first gate 1804 and 180 degree shifted sinusoidal signal 1810 from second gate 1806. The following example will assist in explaining this embodiment.

Assume precision phase adjustor 1604 receives an information signal 812 composed of bits' "1010". Also, assume that precision timing generator 808 sends a signal 820 to gate function generator 822, wherein signal 820 consists of a trigger pulse every 100 nsec, thereby causing gate function generator 822 to output a signal 824 composed of Gaussian pulses spaced 100 nsec apart. Also assume that 100 sinusoidal bursts are to be transmitted for each bit of information. To send bits "1010", precision phase adjustor 1604: activates first gate 1804 for 1 microsecond (i.e., 100×(100× $10^{-9}$)=1 µsec); then activates second gate 1806 for 1 µsec; then actives first gate 1804 for 1 µsec; and then activates second gate 1806 for 1 µsec. This causes summer 1808 to provide a phase modulated signal 1608 to mixer 832, wherein signal 1608 has no phase shift for 1 µsec, then a 180 degree phase shift for 1 µsec, then no phase shift for 1 µsec, and then 180 degree phase shift for 1 μsec. Multiplier 832 multiplies this phase modulated signal 1608 with signal 824, which as discussed above, consists of a periodic (equally spaced) train of Gaussian pulses. Thus, in this example, signal 1612 consists of 100 sinusoidal burst that are not (or nominally) phase shifted, followed by 100 sinusoidal bursts having a 180 degree phase shift, followed by 100 sinusoidal bursts that are not phased shifted, followed by 100 sinusoidal bursts having a 180 degree phase shift.

As explained above, the frequency of sinusoidal signal 830 is selected to provide signal 1612 with a desired center frequency, and the width of each Gaussian pulse in signal 824 is chosen to provide a desired bandwidth.

It will be apparent to persons skilled in the relevant art that various changes can be made to transmitter 1602 without departing from the spirit and scope of the present invention. For example, phase shifts other than 180 degrees can be used to impart modulation. Additionally, there are many additional ways to implement phase modulator 1610. For example, an alternative implementation of phase modulator 1610 is described in the discussion of FIGS. 19 and 20.

Figure 19:
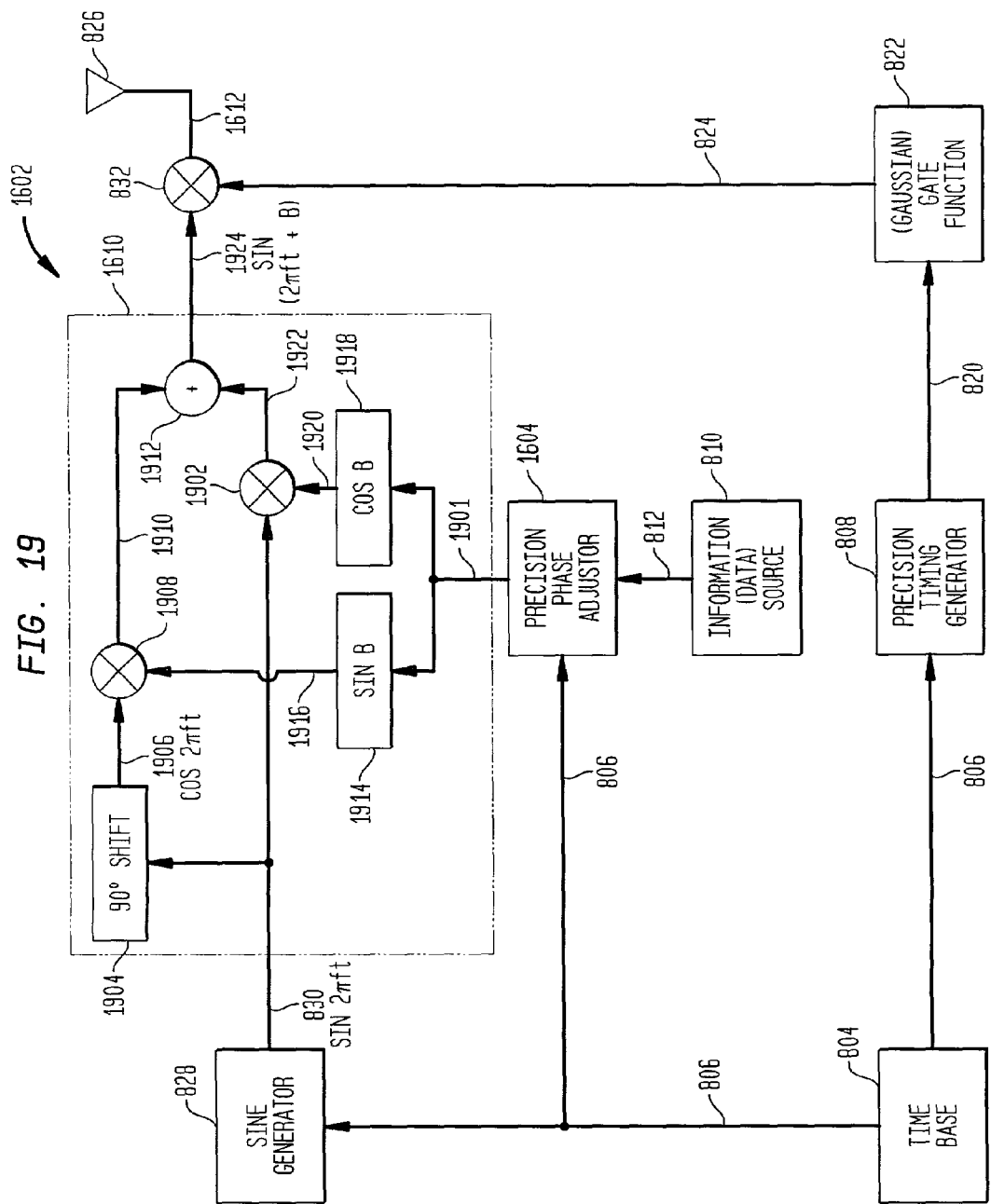
FIG. 19 illustrates a functional diagram of a medium wide band impulse radio transmitter that uses phase modulation, according to another embodiment of the present invention.

Referring to FIG. 19, phase modulator 1610 includes a first multiplier 1902, a 90 degree phase shift circuit 1904, a second multiplier 1908, a summer 1912, a sine generator 1914 and a cosine generator 1918. In this embodiment, phase modulator 1610 is essentially an inphase/quadrature (I/Q) modulator used for a precision delay (i.e., phase shift). This I/Q phase shift circuit implements the standard trigonometric relationship for angle addition:

$$\sin(A+B) = \sin A \cos B + \cos A \sin B$$

Where, A represents the time dependency of signals 830 and 1906 (i.e., $A=2\pi ft$, where, f is the frequency of sinusoidal signal 830, and t is time).

The angle of B is the desired phase shift angle (i.e., Φ) that is applied to the input of multipliers 1908 and 1902 respectively. Precision phase adjustor 1604 determines the angle of B based on information signal 812. Precision phase adjustor 1604 communicates B to sine generator 1914 and cosine generator 1918 via signal 1901. Sine generator 1914 provides signal 1916 (sin B) to multiplier 1908. Cosine generator 1918 provides signal 1920 (cos B) to multiplier 1902. Multiplier 1908 multiplies signal 1906 ($\cos(2\pi ft)$) with signal 1916 (sin B) and outputs signal 1910 ($\cos(2\pi ft)$ *sin B). Multiplier 1902 multiplies signal 830 ($\sin(2\pi ft)$) with signal 1920 (cos B) and outputs signal 1922 ($\sin(2\pi ft)$ *cos B). Summer 1912 adds signal 1910 ($\cos(2\pi ft)$*sin B) and signal 1922 ($\sin(2\pi ft)$*cos B) and outputs signal 1924 (($\cos(2\pi ft)$*sin B)+($\sin(2\pi ft)$*cos B)). Since, sin A cos B+cos A sin B=sin (A+B), then output signal 1924 is equal to $\sin(2\pi ft+B)$.

Figure 20:
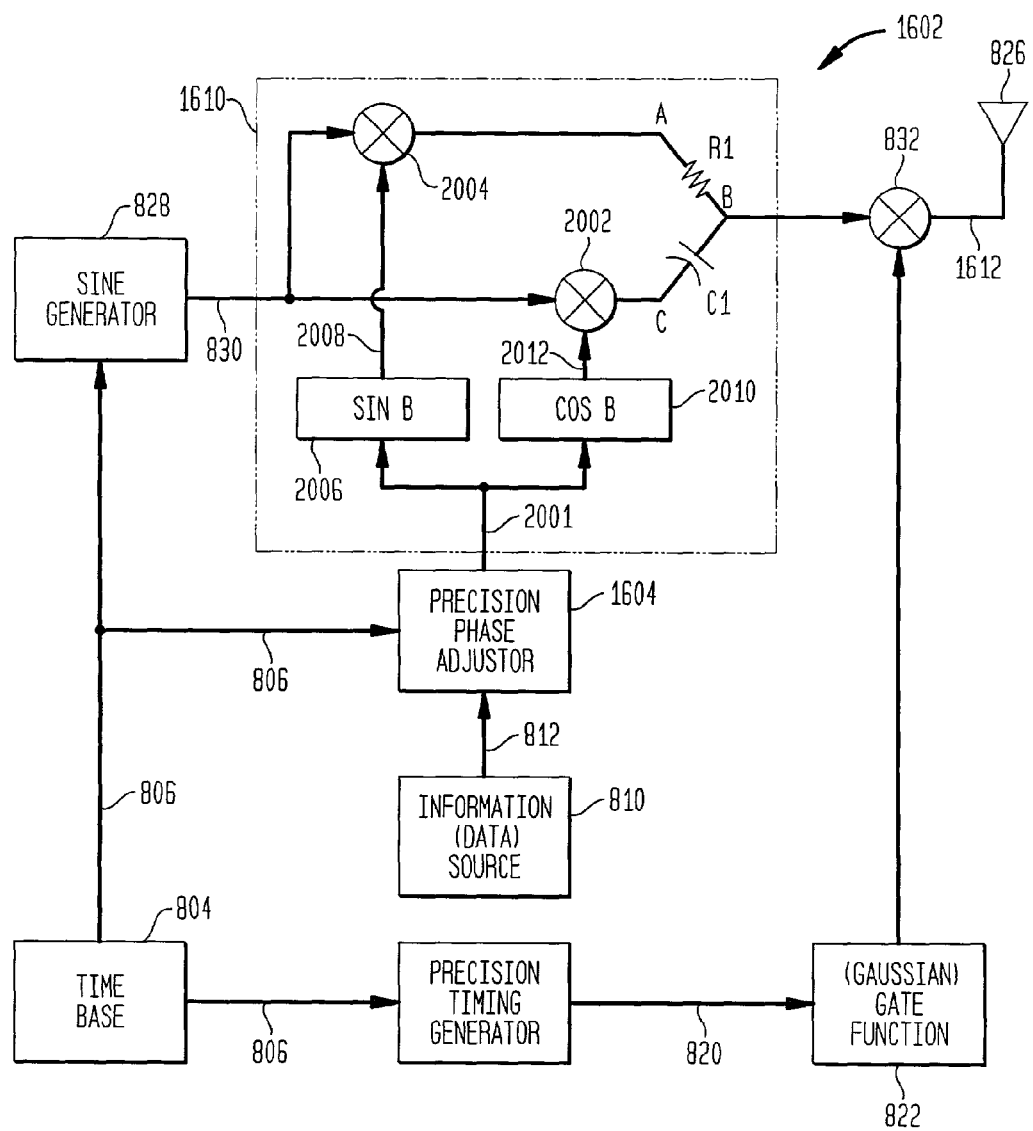
FIG. 20 illustrates a functional diagram of a medium wide band impulse radio transmitter that uses phase modulation, according to another embodiment of the present invention.

FIG. 20 illustrates an alternative I/Q phase shift approach. Sinusoidal signal 830 ($2\pi ft$) is provided to a first multiplier 2002 and a second multiplier 2004. Precision phase adjustor 1604 determines the angle of B (the desired phase shift angle, Φ) based on information signal 812. Precision phase adjustor 1604 communicates B to sine generator 2006 and cosine generator 2010 via signal 2001. Sine generator 2006 provides signal 2008 (sin B) to multiplier 2004. Cosine generator 2010 provides signal 2012 (cos B) to multiplier 2002. The outputs of multipliers 2002, 2004 are then inphase sinusoidal signals with relative amplitudes proportional to the respective sine and cosine values applied to the multipliers. These outputs of multipliers 2002, 2004 are fed to the RC network comprising R1 and C1. The top sinusoidal signal lags 45 degrees from point A to B. The bottom sinusoidal signal leads 45 degrees from point C to B. The result is two sinusoidal signals 90 degrees out phase forming a phase shifter based on the same math as the described in the discussion of FIG. 19.

Figure 21:
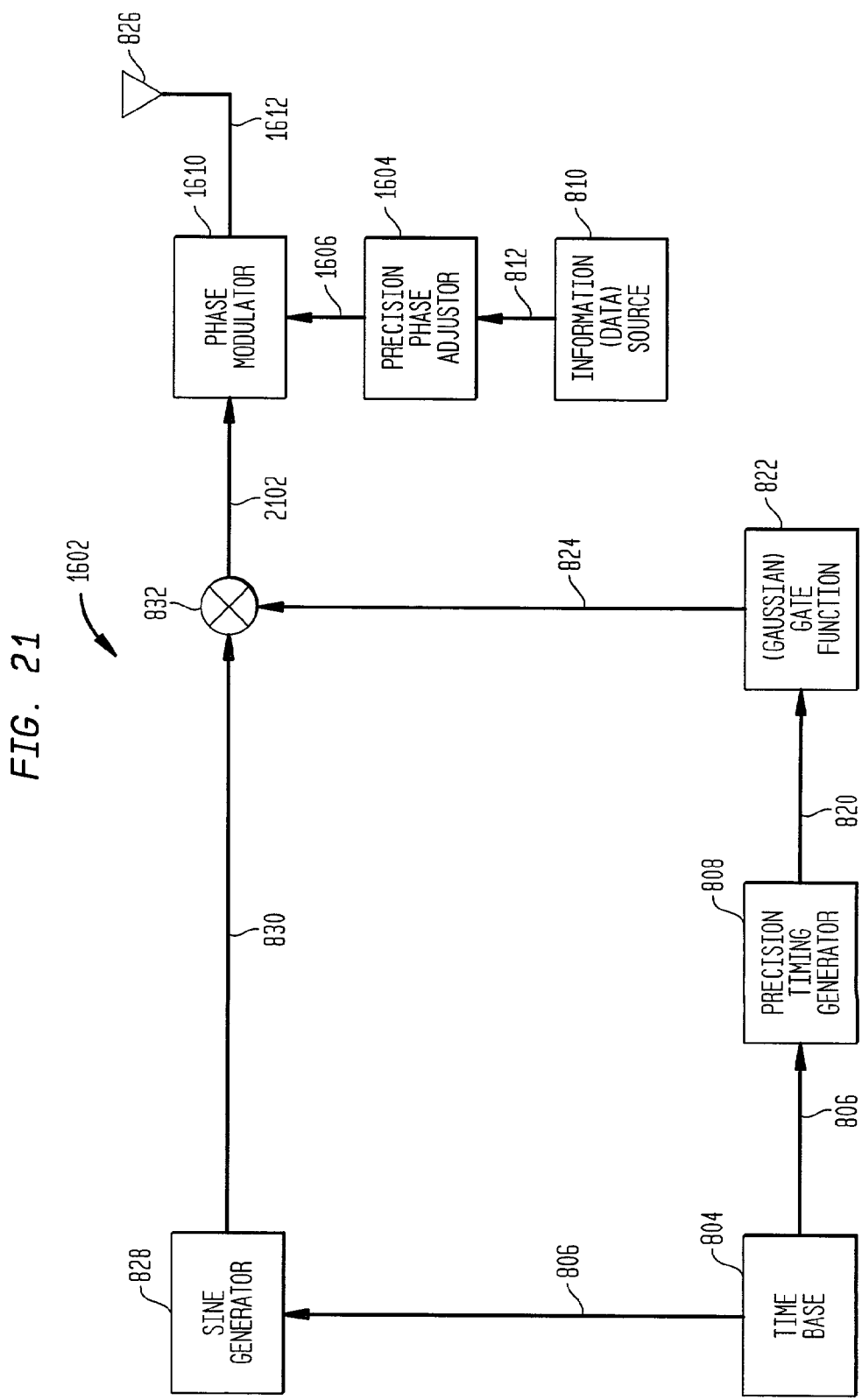
FIG. 21 illustrates a functional diagram of a medium wide band impulse radio transmitter that uses phase modulation, according to yet another embodiment of the present invention.

In another embodiment, shown in FIG. 21, multiplier 832 multiplies sinusoidal signal 830 with a signal 824 that consists a periodic (evenly spaced) train of Gaussian pulses signal 824, to produce a signal 2102 that consists of a non-phase modulated periodic train of sinusoidal bursts. In this embodiment, phase modulator 1610 offsets the phase of signal 2102 based on information signal 812. That is, the phase modulation occurs after signal 830 is multiplied by signal 824. The output of phase modulator 1610 is signal 1612, which consists of a train of phase modulated Gaussian shaped sinusoidal bursts.

b. Receiver

A receiver that is substantially similar receiver 1202, described above in the discussion of FIG. 12, can be used to receive signals transmitted by transmitter 1602.

IV.4. Sinusoidal Burst Phase Shift Modulation with Coding

For each bit of information, the above discussed transmitters may transmit multiple (e.g., 100) sinusoidal bursts having the same phase shift. This may give rise to a comb line spectrum, where each line may contain too much concentrated spectral power. To avoid this, an additional random or pseudo-random phase shift can be added to each sinusoidal burst. Accordingly, in another embodiment, pseudo-random codes (also referred to as PN codes) are used to smooth the spectrum.

a. Transmitter

Figure 22:
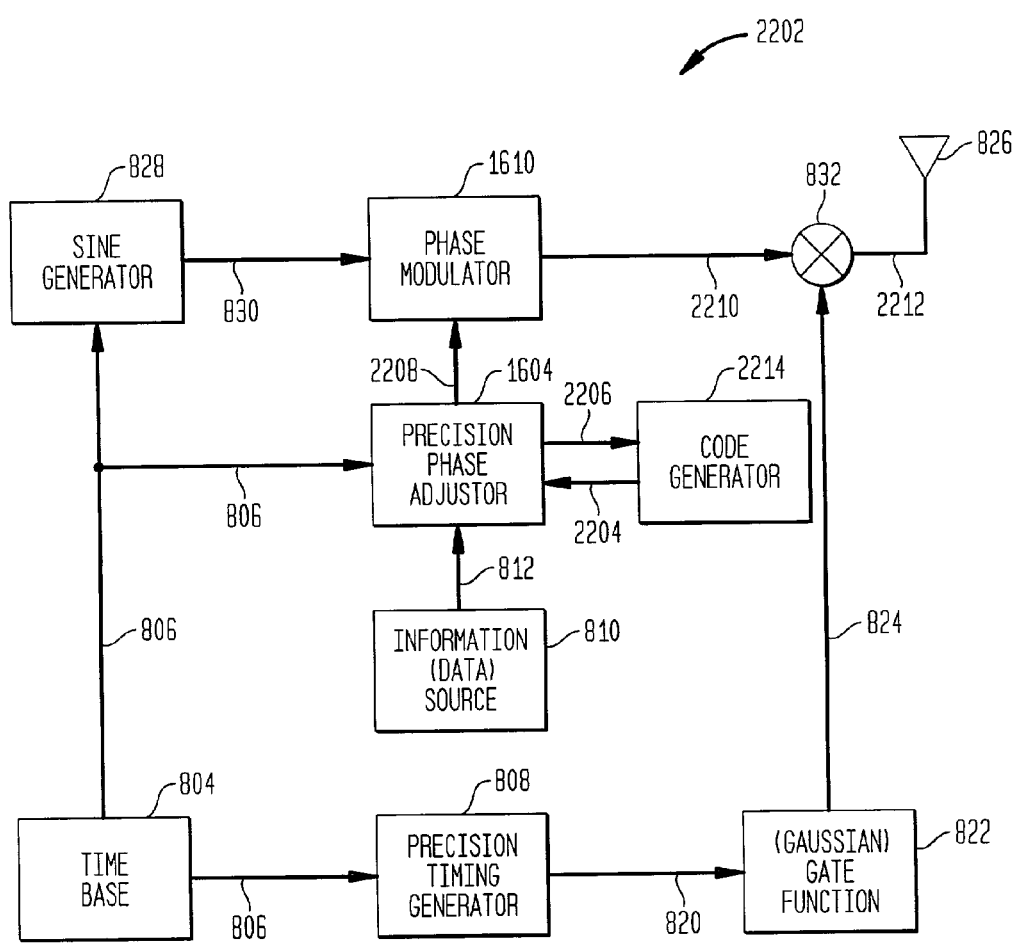
FIG. 22 illustrates a functional diagram of a medium wide band impulse radio transmitter that uses phase modulation and coding, according to an embodiment of the present invention.

As shown in FIG. 22, a transmitter 2202 includes a code generator 2214 that is used to code the output of precision phase adjustor 1604. The code generator 2214, also referred to as a code source, comprises a storage device such as a random access memory (RAM), read only memory (ROM), or the like, for storing suitable PN codes and for outputting the PN codes as a code signal 2204. Alternatively, maximum length shift registers or other computational means can be used to generate the PN codes. Precision phase adjustor 1604, which receives a periodic timing signal 806 from time base 804, supplies synchronizing signal 2206 to code generator 2214 and utilizes the code source output 2206 together with an internally generated subcarrier signal (which is optional) and information signal 812 to generate a phase adjustment signal 2208.

Figure 23:
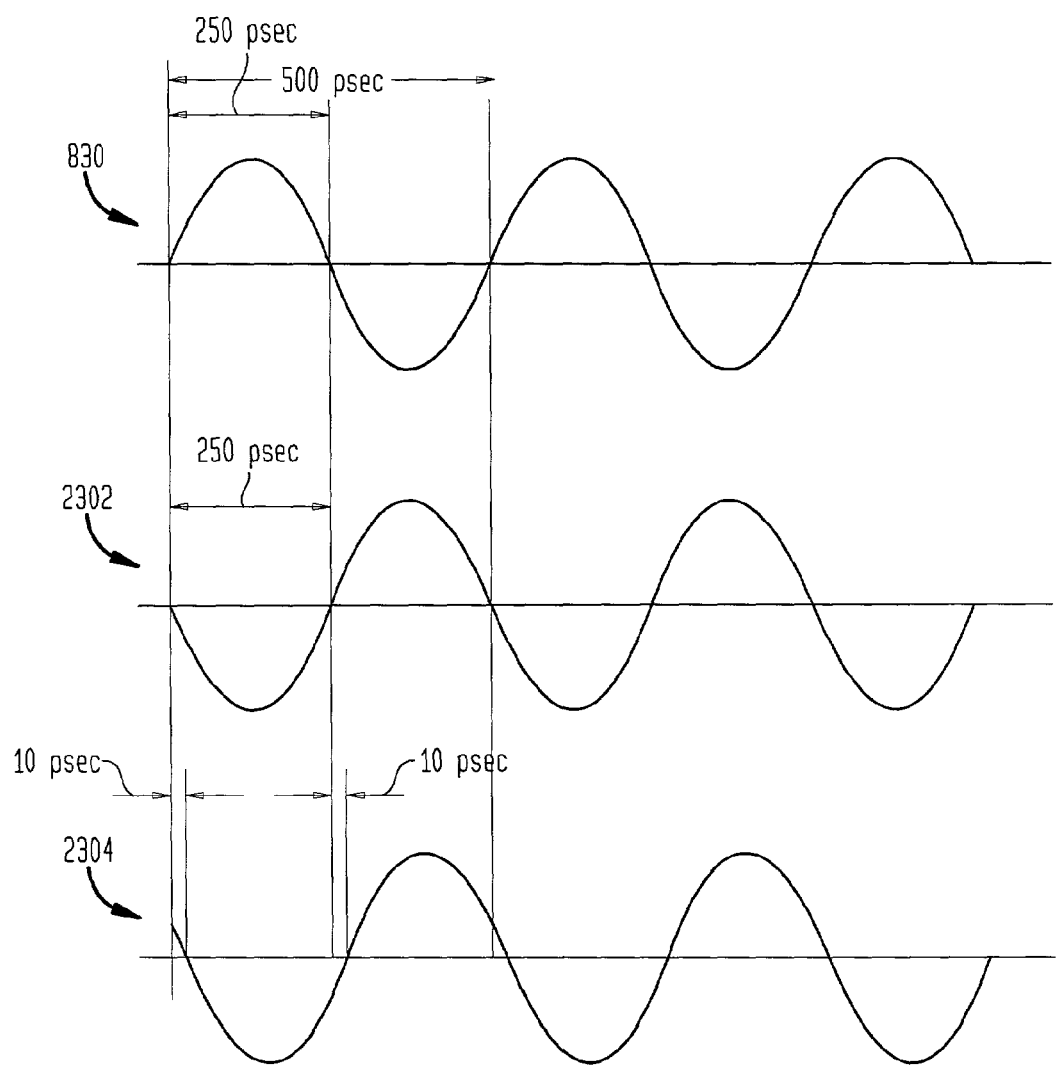
FIG. 23 illustrates sinusoidal waveforms that are useful in explaining an embodiment of the present invention.

Phase adjustment signal 2208 can be thought of as including both an information component and a coding component. Thus, an output signal 2210 of phase modulator 1610 can be thought of as having a phase adjustment based on information and a phase adjustment based on code. This can be better explained with reference to FIG. 23. Assume that sine generator 828 produces a 2 GHz sinusoidal signal 830, wherein a period of each wave is 500 picoseconds (i.e., $1/(2\times10^9)=500\times10^{-12}=500$ psec), as shown in FIG. 23. In one example embodiment, the information component of phase adjustment signal 2208 may cause phase modulator 1610 to shift signal 830 by 180 degrees (i.e., 250 psec), resulting in signal 2302. The code component of phase adjustment signal may cause phase modulator 1610 to shift signal 2302 by an additional amount, for example, between 0 and 50 psec (e.g., 10 psec), resulting in a signal 2304. More likely, phase adjustment signal 2208 will include combined information and code phase adjustments and simply cause phase modulator 1610 to shift signal 830 by 260 psec (i.e., 250 psec for information modulation, and 10 psec for coding modulation), resulting in signal 2304.

Returning to FIG. 22, multiplier 832 multiplies information and code phase modulated sinusoidal signal 2210 with signal 824, which consists of a periodic train of Gaussian shaped pulses. Multiplier 832 then outputs an information and code phase modulated signal 2212, which is transmitted by antenna 826. Information and code phase modulated signal 2212 consists of a periodic (i.e., evenly spaced) train of information and code phase modulated sinusoidal bursts. As discussed above, the bandwidth of signal 2212 is dependent on the width of each sinusoidal burst. Also, as discussed above, the center frequency of the frequency band of signal 2212 is dependent on the frequency of sinusoidal signal 830. Thus, the bandwidth and center frequency of signal 2212 can be controlled, respectively, by adjusting the width of the Gaussian pulses in Gaussian pulse train signal 824 and by adjusting the frequency of sinusoidal signal 830.

If multiple (e.g., 100) sinusoidal bursts are to be transmitted for each bit of information, then preferably the information component for the multiple (e.g., 100) sinusoidal bursts will be the same while the coding component will change on a burst by burst basis. For example, assume that in one embodiment the information component of phase adjustment signal 2208 will have no phase shift for a "0" bit and a 180 degree phase shift (e.g., a 250 psec shift, if the frequency of signal 830 is 2 GHz). Also assume that the coding component of phase adjustment signal 2208 will shift the phase between 0 psec and 50 psec. When a "0" bit is transmitted, each of the multiple (e.g., 100) sinusoidal bursts will have a phase shift between 0 psec and 50 psec (e.g., the first burst has an offset of 10 psec, the second burst has an offset of 40 psec, . . . the hundredth burst has an offset of 35 psec). When a "1" bit is transmitted, each of the multiple (e.g., 100) sinusoidal bursts will have a phase shift between 250 psec and 300 psec (e.g., the first burst has an offset of 280 psec, the second burst has an offset of 255 psec, . . . the hundredth burst has an offset of 265 psec). The effect of using codes to vary the phase shift on burst by burst basis is to spread the energy distribution of signal 2212 in the frequency domain. Additionally, if the PN codes of code generator 2214 are designed to have low cross correlation such that a train of sinusoidal bursts using one code will seldom collide with a train of sinusoidal bursts using another code, then code generator 2214 can also be used for establishing independent communication channels.

b. Receiver

Figure 24:
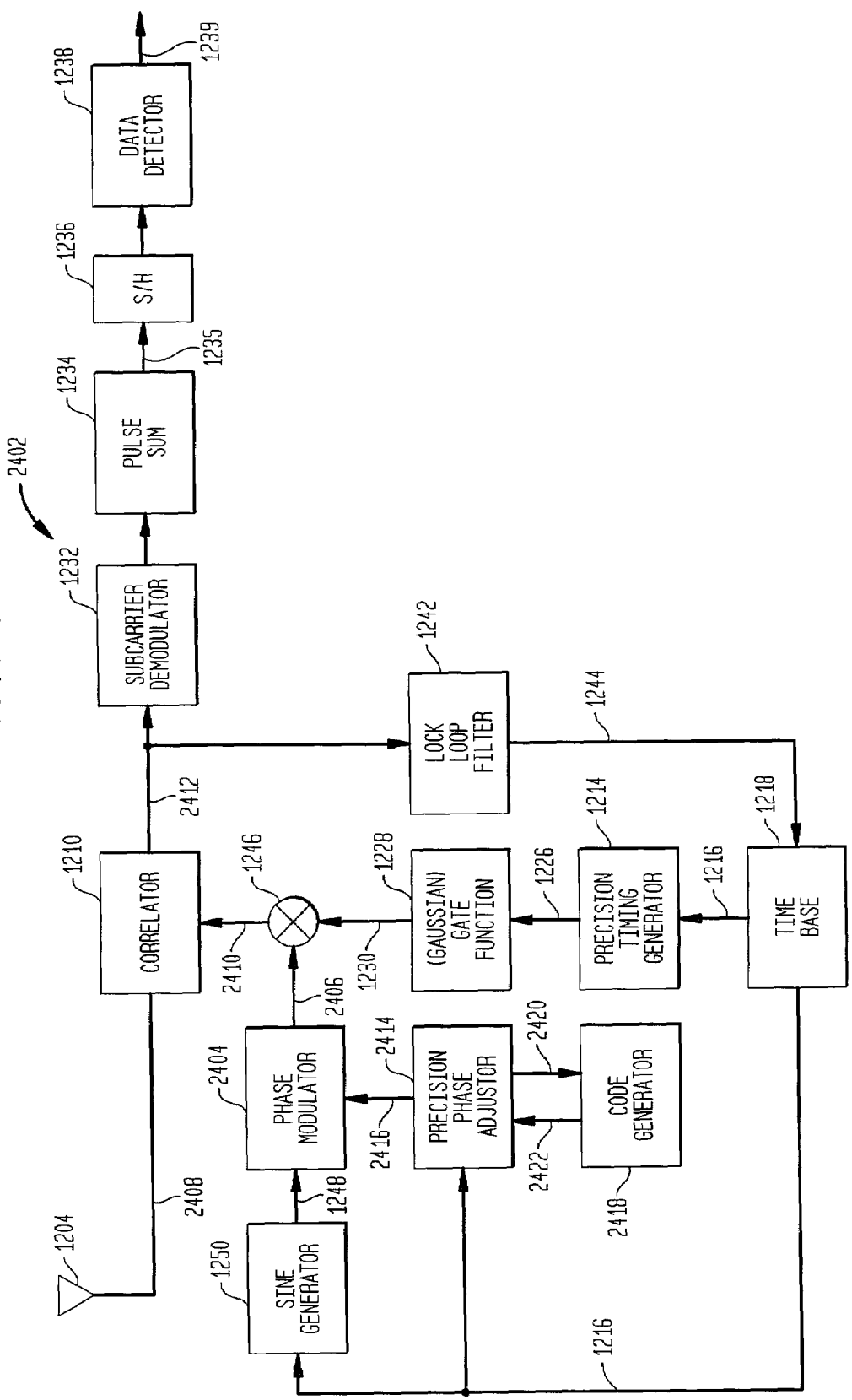
FIG. 24 illustrates a functional diagram of a medium wide band impulse radio receiver for receiving code phase modulated medium wide band signals, according to an embodiment of the present invention.

FIG. 24 shows an impulse radio receiver 2402 according to an embodiment of the present invention. Receiver 2402 includes an antenna 1204 for receiving a propagated impulse radio signal. A received coded signal 2408 is input to a cross correlator (also called a sampler 1210) to produce a baseband output 2412.

Receiver 2402 also includes a precision phase adjustor 2414, a precision timing generator 1214, and a sine generator 1250, each of which receives a periodic timing signal 1216 from a time base 1218. Time base 1218 is adjustable and controllable in time, frequency, or phase, as required by a lock loop (described below) in order to lock on the received signal 2408. Precision phase adjustor 2414 provides synchronization signal 2420 to code generator 2418 (which is required since the received signal 2408 is coded) and receives a code control signal 2422 from code generator 2418. Precision timing generator 2414 utilizes periodic timing signal 1216 to produce a periodic triggering signal 1226.

Sine generator 1250 generates sinusoidal signal 1248, which is provided to phase modulator 2404. Precision phase adjustor 2414 outputs a code phase adjustment signal 2416, which, based on code signal 2422, causes phase modulator 2404 to adjust the phase of sinusoidal signal 1248. Phase modulator 2404 outputs a code phase modulated sinusoidal signal 2406, which is provided to multiplier 1246.

Gate function generator 1228, which preferably produces a signal 1230 consisting of a periodic train of Gaussian pulses, is triggered by trigger signal 1226. Multiplier 1246 multiplies code phase modulated sinusoidal signal 2406 with periodic train of Gaussian pulses signal 1230. Multiplier 1246 outputs a template signal 2410 consisting of a train of sinusoidal bursts ideally having waveforms substantially equivalent to each sinusoidal burst of received signal 2408. The code used for receiving a given signal is the same code utilized by the originating transmitter (e.g., used by code generator 2214 of transmitter 2202) to generate the propagated signal (i.e., received coded signal 2408). Additionally, sinusoidal signal 1248 has the same frequency as the sinusoidal signal that was used to generate received coded signal 2408 (e.g., sinusoidal signal 830 generated by transmitter 2202). Thus, the timing of template signal 2410 matches the timing of received coded signal 2408, allowing received coded signal 2408 to be synchronously sampled by correlator 1210. Correlator 1210 ideally comprises a multiplier followed by a short term integrator to sum the multiplied product over the pulse interval.

Baseband output 2412 of correlator 1210 is coupled to an optional subcarrier demodulator 1232, which demodulates the optional subcarrier information signal from the subcarrier. One of the purposes of the optional subcarrier process, when used, is to move the information signal away from DC (zero frequency) and thereby improves immunity to low frequency noise and offsets. An output of subcarrier demodulator 1232 is then filtered or integrated in a pulse summation stage 1234. A sample and hold 1236 samples output 1235 of pulse summation stage 1234 synchronously with the completion of the summation of a digital bit or symbol. An output of sample and hold 1236 is then compared with a nominal zero (or reference) signal output in a detector stage 1238 to determine an output signal 1239 representing the digital state of the output voltage of sample and hold 1236.

Baseband signal 2412 is also input to a lock loop filter 1242, which in one embodiment is a lowpass filter. A control loop comprising lock loop filter 1242, time base 1218, precision timing generator 1214, gate function generator 1228, and correlator 1210 is used to generate an error signal 1244. Error signal 1244 provides adjustments to adjustable time base 1218 to time position periodic timing signal 1226 in relation to the position of received signal 2408 for accurate cross correlation and decoding.

IV.5. Sinusoidal Burst Position and Phase Shift Modulation

In the following embodiment, the above discussed sinusoidal burst position modulation and the sinusoidal burst phase shift modulation concepts are combined.

a. Transmitter

Transmitter 2502 comprises a time base 804 that generates a periodic timing signal 806. Periodic timing signal 806 is supplied to a precision phase adjustor and timing generator 2504. Periodic timing signal 806 is also provided to a sine generator 828.

Precision phase adjustor and timing generator 2504 utilizes an internally generated subcarrier signal (which is optional) and an information signal 812 to generate a modulated timing signal 820 and a phase adjustment signal 1606. An information source 810 supplies information signal 812 to precision phase adjustor and timing generator

2504. Information signal 812 can be any type of intelligence, including, but not limited to, digital bits representing voice, data, imagery, or the like, analog signals, or complex signals. Gate function generator 822 uses modulated timing signal 820 (also referred to as time dither signal 820 or trigger signal 820) as a trigger to generate output pulses 824, which are preferably Gaussian shaped. Pulse position modulation (also referred to as time shift modulation) is used to alter the time at which each Gaussian pulse is positioned. Phase modulator 1610 adjusts the phase of sinusoidal signal 830, based on phase adjustment signal 1606, and outputs a phase modulated signal 1608.

In this embodiment, phase modulation and pulse position modulation are used together to produce a phase and position modulated signal 2506. Below, Table 1 shows an example of a modulation scheme that can be employed.

TABLE 1

| Phase | Position | Bits |
|---|---|---|
| $P_0$ | $T_0$ | 00 |
| $P_0$ | $T_1$ | 01 |
| $P_1$ | $T_0$ | 10 |
| $P_1$ | $T_1$ | 11 |

Figure 25:
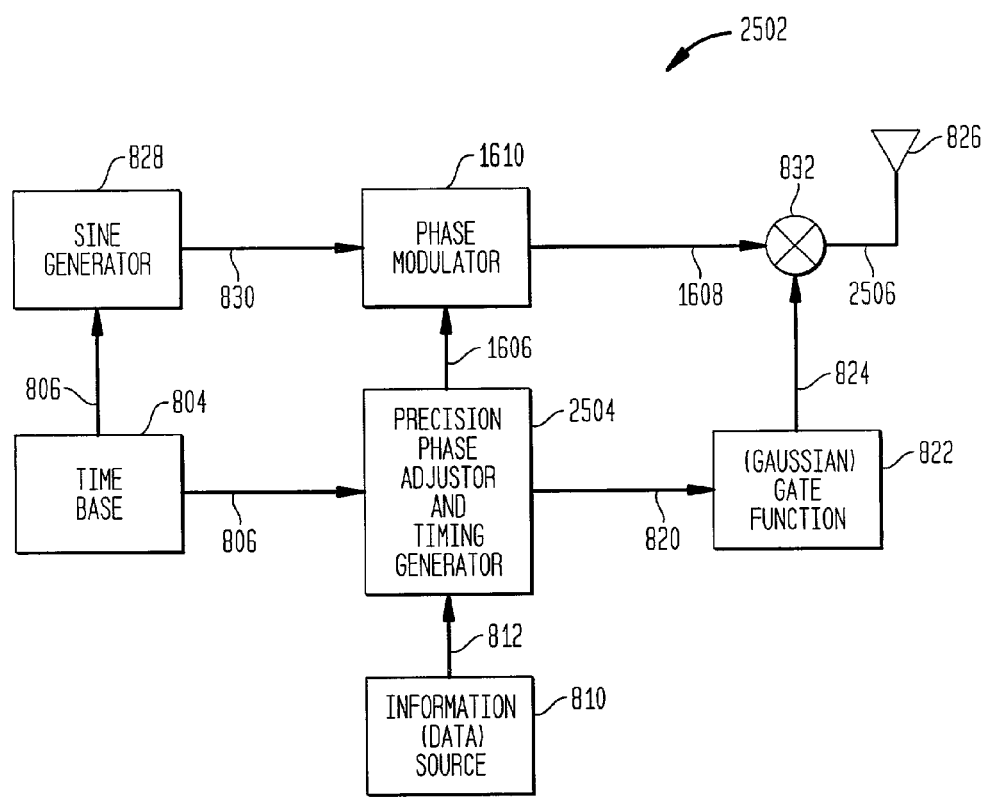
FIG. 25 illustrates a functional diagram of a medium wide band impulse radio transmitter that uses phase and pulse position modulation, according to an embodiment of the present invention.
Figure 26:
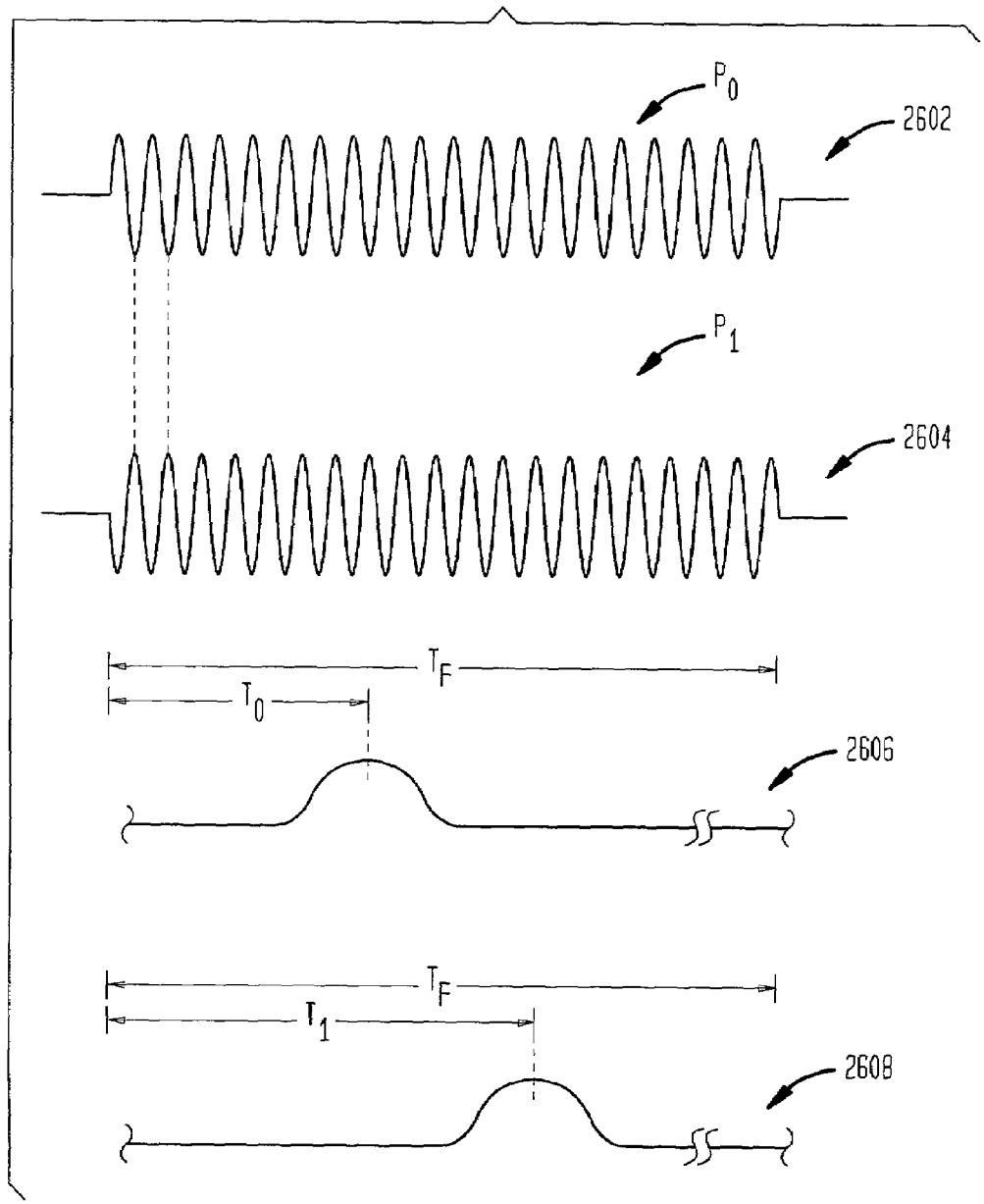
FIG. 26 illustrates waveforms that are useful in explaining an embodiment of the present invention.
Figure 27:
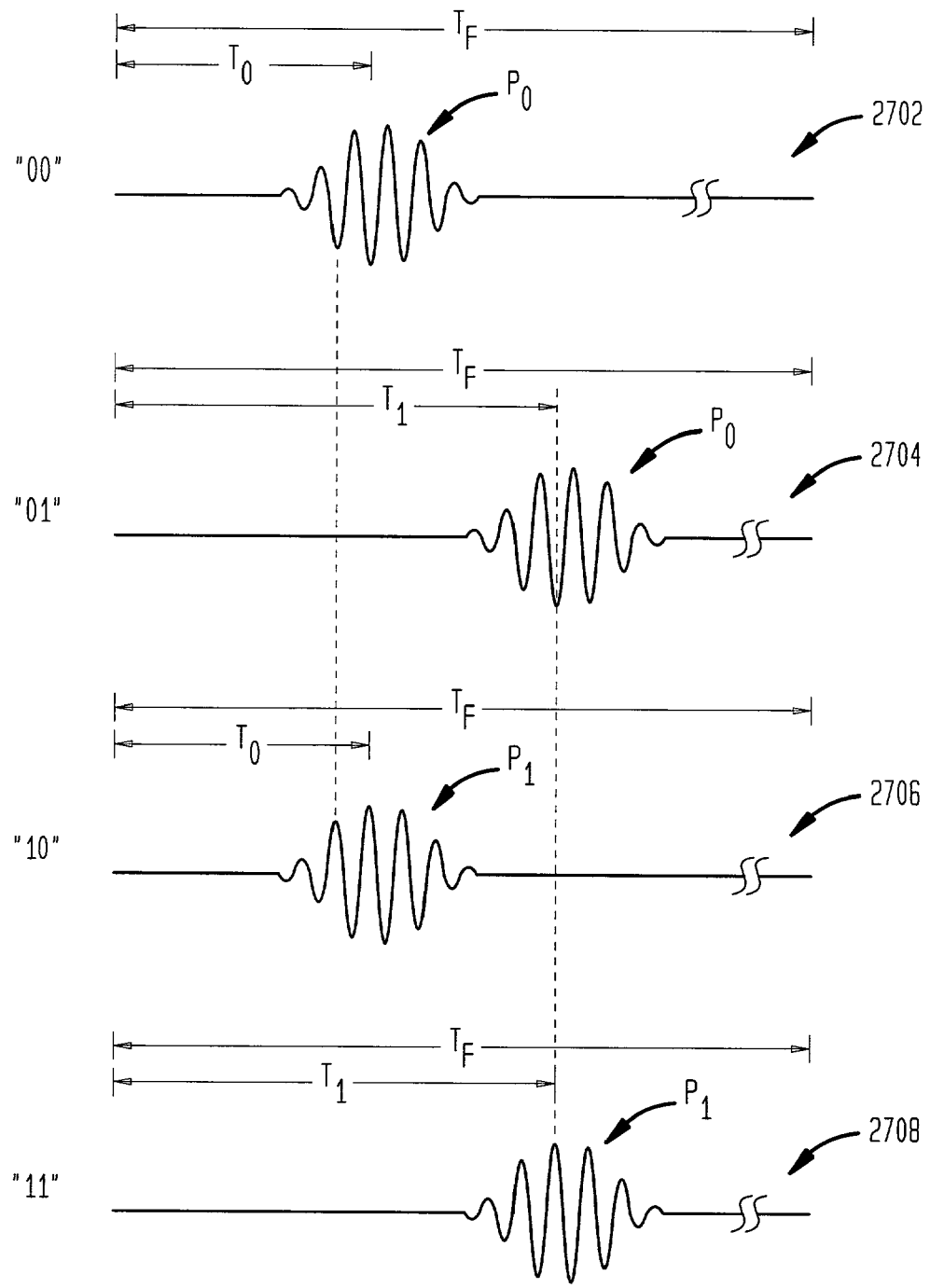
FIG. 27 illustrates sinusoidal bursts that are useful in explaining a modulation scheme according to an embodiment of the present invention.
Figure 28:
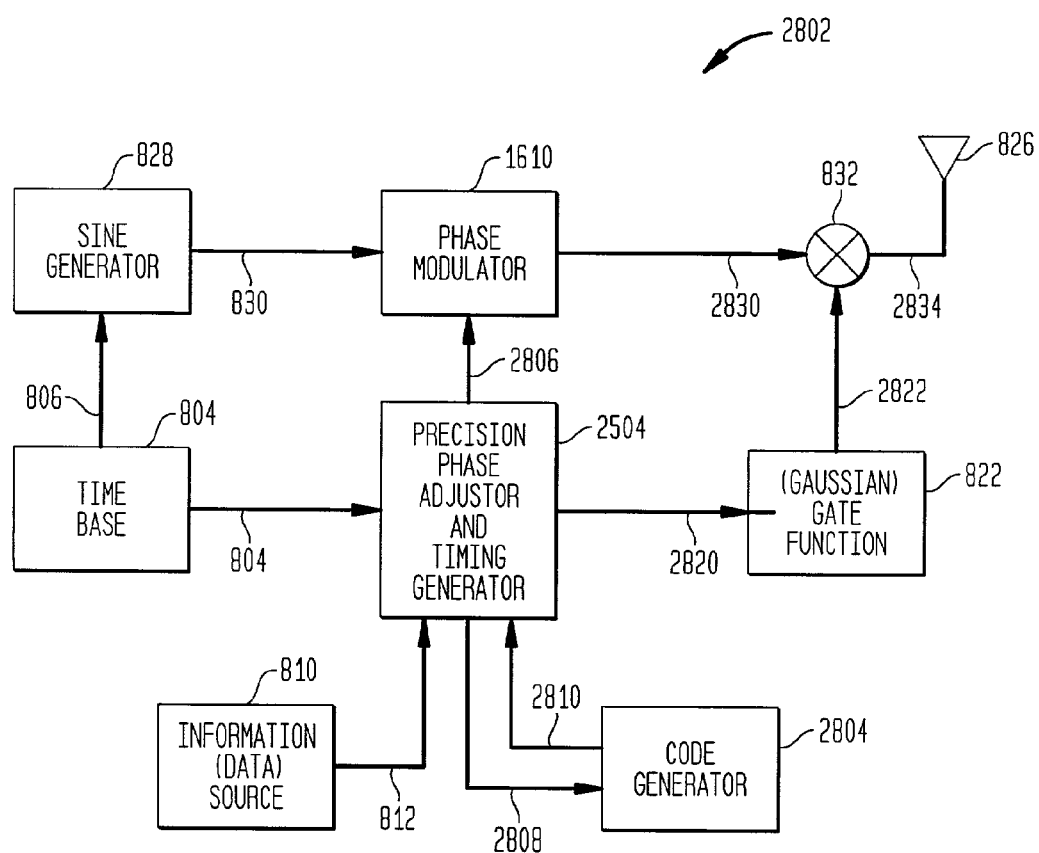
FIG. 28 illustrates a functional diagram of a medium wide band impulse radio transmitter that uses phase and pulse position modulation and coding according to an embodiment of the present invention.

Referring to FIGS. 25–27 and to Table 1, in this exemplary modulation scheme, a sinusoidal burst that has no (or nominal) phase shift (i.e., $P_0$) and a nominal position offset (i.e., $T_0$) is used to represent bits "00". Such a sinusoidal burst can be created by multiplying a sinusoid 2602 having no phase shift (i.e., $P_0$) with a Gaussian pulse 2606 having a nominal position offset (i.e., $T_0$). Accordingly, to generate a sinusoidal burst representing bits "00", precision phase adjustor and timing generator 2504 instructs phase modulator 1610 (via phase adjustment signal 1606) to produce no (or nominal) phase offset. Precision phase adjustor and timing generator 2504 also provides a position modulated trigger signal 820 having a nominal position offset (i.e., $T_0$) to gate function generator 822. In response to receiving signal 820, gate function generator 822 outputs a signal 824 consisting of a Gaussian pulse(s) having a nominal position offset (i.e., $T_0$) and resembling signal 2606. In response to receiving signal 1606, phase modulator 1610 outputs a sinusoidal signal 1608 having no (or nominal) phase offset and resembling signal 2602. Thus, when multiplier 832 multiplies signal 1608 with signal 824, it essentially multiplies signal 2602 with signal 2606. This results in a sinusoidal burst signal 2702, which has no phase offset (i.e., $P_0$) and a nominal position offset (i.e., $T_0$). Transmitter 2502 may transmit multiple (i.e., 100) sinusoidal bursts 2702 for each bit pair "00". This yields a phase and position modulated signal 2506 that comprises a train of identically shaped pulses for each data bit pair. An impulse radio receiver can then receive and integrate the multiple sinusoidal bursts to recover the transmitted information.

Referring again to Table 1, a sinusoidal burst that has no (or nominal) phase shift (i.e., $P_1$) and a specified position offset (i.e., $T_1$) is used to represent bits "01". If each frame ($T_f$) is 100 nsec, the specified position offset can be, for example, 10 nsec greater than the nominal position offset (e.g., $T_1 = T_0 + 10$ nsec). Such a sinusoidal burst can be created by multiplying a sinusoidal signal 2602 having no (or nominal) phase shift (i.e., $P_0$) with a Gaussian pulse 2608 having the specified position offset (i.e., $T_1$). Accordingly, to generate a sinusoidal burst representing bits "01", precision phase adjustor and timing generator 2504 instructs phase modulator 1610 (via phase adjustment signal 1606) to produce no (or nominal) phase offset. Precision phase adjustor and timing generator 2504 also provides a position modulated timing trigger signal 820 having the specified position offset (i.e., $T_1$) to gate function generator 822. In response to receiving signal 820, gate function generator 822 outputs a signal 824 consisting of a Gaussian pulse(s) having the specified position offset (i.e., $T_0$) and resembling signal 2608. In response to receiving signal 1606, phase modulator 1610 outputs a sinusoidal signal 1608 having no phase offset and resembling signal 2602. Thus, when multiplier 832 multiplies signal 1608 with signal 824, it essentially multiplies signal 2602 with signal 2608. This results in a sinusoidal burst signal 2704, which has no phase offset (i.e., $P_0$) and the specified position offset (i.e., $T_1$). Transmitter 2502 can transmit multiple (e.g., 100) sinusoidal bursts 2704 for each bit pair "01". This yields a phase and position modulated signal 2506 that comprises a train of identically shaped pulses for each data bit pair. An impulse radio receiver can receive and integrate the multiple sinusoidal bursts to recover the transmitted information.

Referring again to Table 1, a sinusoidal burst that has a specified phase shift (i.e., $P_1$) and a nominal position offset (i.e., $T_0$) is used to represent bits "10". The specified phase shift can be, for example, 180 degrees. Such a sinusoidal burst can be created by multiplying a sinusoid 2604 having the specified phase shift (i.e., $P_1$) with a Gaussian pulse 2606 having no position offset (i.e., $T_0$). Accordingly, to generate a sinusoidal burst representing bits "10", precision phase adjustor and timing generator 2504 instructs phase modulator 1610 (via phase adjustment signal 1606) to produce the specified phase offset (i.e., $P_1$). Precision phase adjustor and timing generator 2504 also provides a position modulated trigger signal 820 having a nominal position offset (i.e., $T_1$) to gate function generator 822. In response to receiving signal 820, gate function generator 822 outputs a signal 824 consisting of a Gaussian pulse(s) having a nominal position offset (i.e., $T_0$) and resembling signal 2606. In response to receiving signal 1606, phase modulator 1610 outputs a sinusoidal signal 1608 having the specified phase offset and resembling signal 2604. Thus, when multiplier 832 multiplies signal 1608 with signal 824, it essentially multiplies signal 2604 with signal 2606. This results in a sinusoidal burst signal 2706, which has the specified phase offset (i.e., $P_1$) and the nominal position offset (i.e., $T_0$). Transmitter 2502 can transmit multiple (i.e., 100) sinusoidal bursts 2706 for each bit pair "10". This yields a phase and position modulated signal 2506 that comprises a train of identically shaped pulses for each data bit pair. An impulse radio receiver can receive and integrate the multiple sinusoidal bursts to recover the transmitted information.

Referring again to Table 1, a sinusoidal burst that has a specified phase shift (i.e., $P_1$) and a specified position offset (i.e., $T_1$) is used to represent bits "11". Such a sinusoidal burst can be created by multiplying a sinusoid 2604 having the specified phase shift (i.e., $P_1$) with a Gaussian pulse 2606 having the specified offset (i.e., $T_1$). Accordingly, to generate a sinusoidal burst representing bits "11", precision phase adjustor and timing generator 2504 instructs phase modulator 1610 (via phase adjustment signal 1606) to produce the specified phase offset. Precision phase adjustor and timing generator 2504 also provides a position modulated trigger signal 820 having the specified position offset (i.e., $T_1$) to gate function generator 822. In response to receiving signal 820, gate function generator 822 outputs a signal 824 consisting of a Gaussian pulse(s) having the specified offset (i.e., $T_1$) and resembling signal 2608. In response to receiving signal 1606, phase modulator 1610 outputs a sinusoidal signal 1608 having the specified phase offset (i.e., $P_1$) and resembling signal 2604. Thus, when multiplier 832 multiplies signal 1608 with signal 824, it essentially multiplies signal 2604 with signal 2608. This results in a sinusoidal burst signal 2708, which has the specified phase offset (i.e., $P_1$) and the specified position offset (i.e., $T_1$). Transmitter 2502 can transmit multiple (e.g., 100) sinusoidal bursts 2708 for each bit pair "11". This yields a phase and position modulated signal 2506 that comprises a train of identically shaped pulses for each data bit pair. An impulse radio receiver can receive and integrate the multiple sinusoidal bursts to recover the transmitted information.

This is just one example of a modulation scheme that uses both phase offset and position offset to impart information on a medium wide band signal made up of sinusoidal bursts. It will be apparent to persons skilled in the relevant art that various other modulation schemes can be used without departing from the spirit and scope of the present invention.

b. Receiver

A receiver that is substantially similar to receiver 1202, described above in the discussion of FIG. 12, can be used to receive signals transmitted by transmitter 1602.

IV.6. Sinusoidal Burst Position and Phase Shift Modulation with Coding

As explained below, random or pseudo random codes can be used to smooth the frequency spectrum of the phase and position modulated sinusoidal bursts discussed above.

a. Transmitter

Transmitter 2802 comprises a time base 804 that generates a periodic timing signal 806. Periodic timing signal 806 is supplied to a precision phase adjustor and timing generator 2504. Periodic timing signal 806 is also provided to a sine generator 828.

Transmitter 2802 also includes a code generator 2804 that is used to code the outputs of precision phase adjustor and timing generator 1604. The code generator 2804, also referred to as a code source, comprises a storage device such as a random access memory (RAM), read only memory (ROM), or the like, for storing suitable PN codes and for outputting the PN codes as a code signal 2810. Alternatively, maximum length shift registers or other computational means can be used to generate the PN codes. Precision phase adjustor and timing generator 2504 supplies synchronizing signal 2808 to code generator 2804 and utilizes the code source output 2810 together with an internally generated subcarrier signal (which is optional) and information signal 812 to generate a phase adjustment signal 2806 (also referred to as information and code phase adjustment signal 2806) and a position shifting trigger signal 2820 (also referred to as information and code position modulation timing signal 2820). An information source 810 supplies information signal 812 to precision phase adjustor and timing generator 2504. Information signal 812 can be any type of intelligence, including, but not limited to, digital bits representing voice, data, imagery, or the like, analog signals, or complex signals.

In one embodiment, the most significant bits of code signal 2810 (generated by code generator 2804) are used to produce information and code position modulation timing signal 2820, and the least significant bits of the code are used to produce information and coded phase adjustment signal 2806. In another embodiment, the entire code of signal 2810 (generated by code generator 2804) is used to produce information and coded position modulation timing signal 2820, and the least significant bits of the code are used to produce information and coded phase adjustment signal 2806. Of course, other variations are within the spirit and scope of the present invention.

Gate function generator 822 uses signal 2820 as a trigger to generate a signal 2822 that preferably consists of Gaussian shaped pulses. Pulse position modulation (also referred to as time shift modulation) is used to alter the time at which each Gaussian pulse is positioned. In this embodiment, the position of each pulse is dictated by both information signal 812 and code signal 2810. Phase modulator 1610 adjusts the phase of sinusoidal signal 830, based on signal 2806, and outputs a phase modulated signal 2830. In this embodiment, the phase of signal 2830 is dictated by both information signal 812 and code signal 2810. Multiplier 832 multiplies signal 2830 with signal 2822 to produce an information and code phase and position modulated signal 2834, which consists of information and code phase and position modulated sinusoidal bursts. Signal 2834 is then transmitted by antenna 826. As discussed above, the bandwidth of signal 2834 is dependent on the width of each sinusoidal burst. Also, as discussed above, the center frequency of the frequency band of signal 2834 is dependent on the frequency of sinusoidal signal 830. Thus, the bandwidth and center frequency of signal 2834 can be controlled, respectively, by adjusting the width of the Gaussian pulses in Gaussian pulse train signal 2822 and by adjusting the frequency of sinusoidal signal 830.

If multiple (e.g., 100) sinusoidal bursts are to be transmitted for each bit of information, then the information component for the multiple (e.g., 100) sinusoidal bursts will preferably be the same while the coding component will preferably change on a burst by burst basis. The effect of using codes to vary phase and position on a burst by burst basis is to spread the energy distribution of signal 2834 in the frequency domain. Additionally, if the PN codes of code generator 2804 are designed to have low cross correlation such that a train of sinusoidal bursts using one code will seldom collide with a train of sinusoidal bursts using another code, then code generator 2804 can also be used for establishing independent communication channels.

b. Receiver

Figure 29:
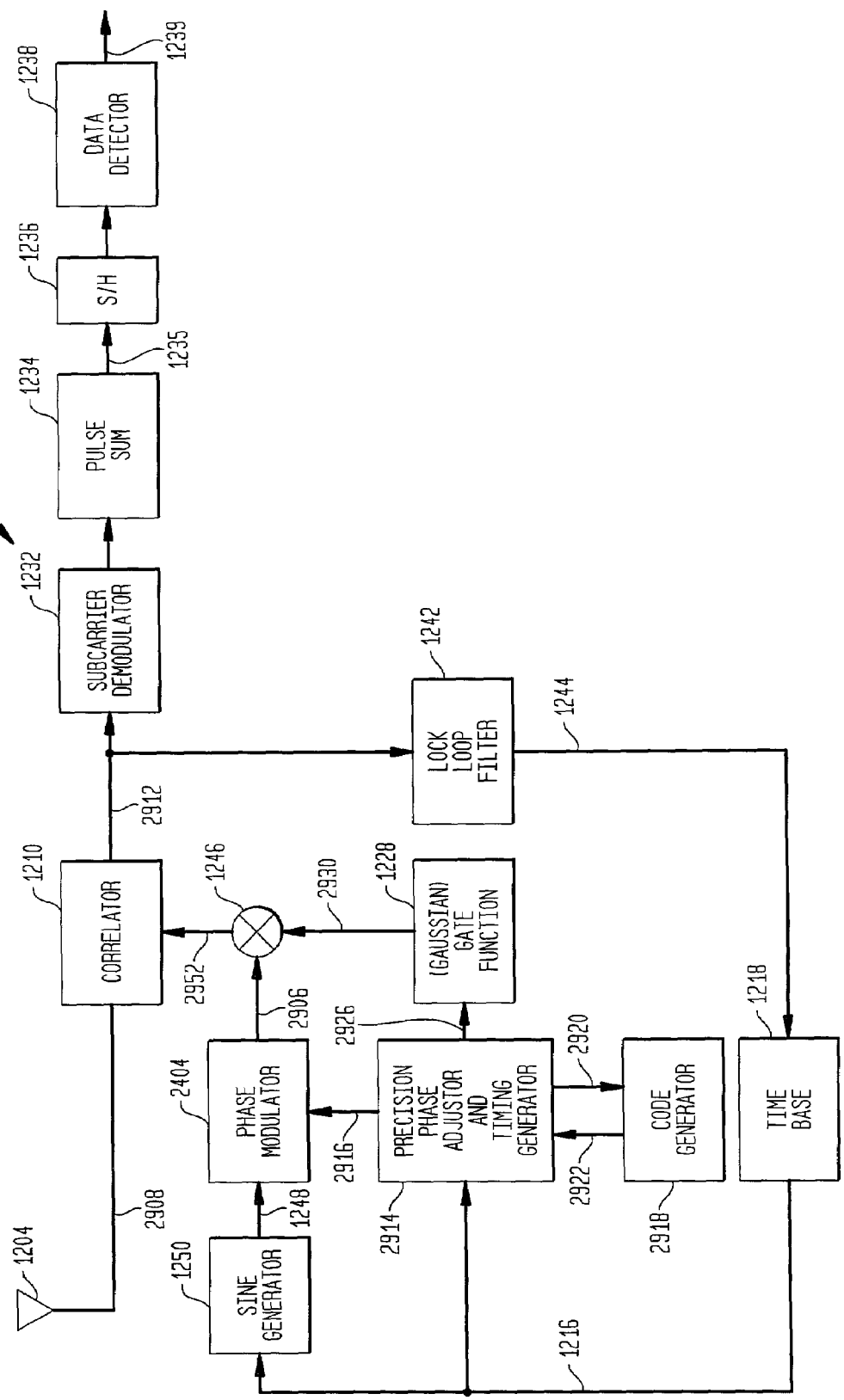
FIG. 29 illustrates a functional diagram of a medium wide band impulse radio receiver that can receive medium wide band signals that are position and phase modulated based on a coding signal, according to an embodiment of the present invention.

FIG. 29 shows an impulse radio receiver 2902 according to an embodiment of the present invention. Receiver 2902 includes an antenna 1204 that receives a propagated impulse radio signal. A received coded signal 2908 is input to a cross correlator (also called a sampler 1210) to produce a baseband output 2912.

Receiver 2902 also includes a precision phase adjustor and timing generator 2914, a sine generator 1250, each of which receives a periodic timing signal 1216 from a time base 1218. Time base 1218 is adjustable and controllable in time, frequency, or phase, as required by a lock loop (described below) in order to lock on the received signal 2908. Precision phase adjustor and timing generator 2914 provides synchronization signal 2920 to code generator 2918 (which is required since the received signal 2908 is coded) and receives a code control signal 2922 from code generator 2918. Precision phase adjustor and timing generator 2914 utilizes periodic timing signal 1216 and code control signal 2922 to produce a triggering signal 2926.

Sine generator 1250 generates sinusoidal signal 1248, which is provided to phase modulator 2404. Precision phase adjustor and timing generator 2914 outputs a phase adjustment signal 2916, which, based on code control signal 2922, causes phase modulator 2404 to adjust the phase of sinusoidal signal 1248. Phase modulator 2404 outputs a code phase modulated signal 2906, which is provided to multiplier 1246.

Gate function generator 1228, which preferably produces a signal 2930 consisting of a train of Gaussian pulses, is triggered by trigger signal 2926. Multiplier 2946 multiplies code phase modulated signal 2906 with train of Gaussian pulses signal 2930. Multiplier 1246 outputs a template signal 2952 consisting of a train of sinusoidal bursts ideally having waveforms substantially equivalent to each sinusoidal burst of received signal 2908. The code used for receiving a given signal is the same code utilized by the originating transmitter (e.g., used by code generator 2804 of transmitter 2802) to generate the propagated signal (i.e., received coded signal 2908). Additionally, the same coding scheme that is used by the transmitter (e.g., transmitter 2802) of the received signal is used by receiver 2902 (e.g., the most significant bits of the code are used to adjust position and the least significant bits of the code are used to adjust phase). Further, sinusoidal signal 1248 has the same frequency as the sinusoidal signal that was used to generate received coded signal 2908 (e.g., sinusoidal signal 830 generated by transmitter 2802). Thus, the timing of template signal 2952 matches the timing of received coded signal 2908, allowing received coded signal 2908 to be synchronously sampled by correlator 1210. Correlator 1210 ideally comprises a multiplier followed by a short term integrator to sum the multiplied product over the pulse interval.

Baseband output 2912 of correlator 1210 is coupled to an optional subcarrier demodulator 1232, which demodulates the optional subcarrier information signal from the subcarrier. One of the purposes of the optional subcarrier process, when used, is to move the information signal away from DC (zero frequency) and thereby improves immunity to low frequency noise and offsets. An output of subcarrier demodulator 1232 is then filtered or integrated in a pulse summation stage 1234. A sample and hold 1236 samples output 1235 of pulse summation stage 1234 synchronously with the completion of the summation of a digital bit or symbol. An output of sample and hold 1236 is then compared with a nominal zero (or reference) signal output in a detector stage 1238 to determine an output signal 1239 representing the digital state of the output voltage of sample and hold 1236.

Baseband signal 2912 is also input to a lock loop filter 1242, which in one embodiment is a lowpass filter. A control loop comprising lock loop filter 1242, time base 1218, precision phase adjustor and timing generator 2914, gate function generator 1228, and correlator 1210 is used to generate an error signal 1244. Error signal 1244 provides adjustments to adjustable time base 1218 to time position periodic timing signal 1216 in relation to the position of received signal 2908 for accurate cross correlation and decoding.

It is noted that the functions of various functional building blocks of this and other embodiment of the present invention can be separated into different functional building blocks or combined into a single functional building block. For example, the functions of the precision phase adjustor and timing generator 2914 can be separated into a precision phase adjustor function block and a timing generator function block.

Additionally, it is noted that the functional blocks of transmitters and receivers have been shown in separate diagrams to simplify the diagrams. It is noted that the functional components of the transmitters and receivers can be combined to form transceivers. For example, the same functional components, such as the time base, sine generator, code generator, and antenna can be used for transmitting and receiving signals.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

It is anticipated that many features of the present invention can be performed and/or controlled by a control processor, which in effect comprises a computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCM-CIA slot and card, etc. Software and data transferred via the communications interface are in the form of signals that can be electronic, electromagnetic, optical or other signals capable of being received by the communications interface. These signals are provided to the communications interface via a channel that can be implemented using wire or cable, fiber optics, a phone line, a cellular phone link, an RF link, and the like.

In this document, the terms "computer program medium" and "computer usable medium" are used to generally refer to media such as removable storage device, a removable memory chip (such as an EPROM, or PROM) within a transceiver, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

In yet another embodiment, features of the invention can be implemented using a combination of both hardware and software.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for receiving an impulse radio signal, comprising the steps of:
    (a) producing a coding signal;
    (b) producing a sinusoidal signal;
    (c) producing a train of pulses;
    (d) adjusting the phase of said sinusoidal signal using said coding signal to produce a code phase modulated sinusoidal signal;
    (e) multiplying said code phase modulated sinusoidal signal by said train of pulses to produce a template signal consisting of a train of code phase modulated sinusoidal bursts; and
    (d) cross correlating a received impulse radio signal with said template signal to output a baseband signal.

2. A method for receiving an impulse radio signal, comprising the steps of:
    (a) producing a coding signal;
    (b) producing a sinusoidal signal;
    (c) producing a train of pulses;
    (d) adjusting the phase of said sinusoidal signal using said coding signal to produce a code phase modulated sinusoidal signal;
    (e) time positioning each pulse of said train of pulses using said coding signal to produce a code position modulated train of pulses;
    (f) multiplying said code phase modulated sinusoidal signal by said code position modulated train of pulses to produce a template signal consisting of a train of code phase and position modulated sinusoidal bursts; and
    (d) cross correlating a received impulse radio signal with said template signal to output a baseband signal.

3. An impulse radio receiver, comprising:
    a sine generator that outputs a sinusoidal signal;
    a precision phase adjustor and timing generator that outputs a phase adjustment signal and a trigger signal;
    a gate function generator that receives said trigger signal and outputs a train of pulses;
    a phase modulator that receives said phase adjustment signal and said sinusoidal signal, and outputs a phase modulated sinusoidal signal;
    a multiplier that multiplies said phase modulated sinusoidal signal with said train of pulses and outputs a template signal consisting of a train of phase modulated sinusoidal bursts; and
    a cross correlator that cross correlates a received impulse radio signal with said template signal and outputs a baseband signal.

4. The impulse radio receiver of claim 3, wherein said precision phase adjustor and timing generator receives a coding signal and produces said phase adjustment signal and said trigger signal using said coding signal.

* * * * *